US012107321B2

(12) United States Patent
Song et al.

(10) Patent No.: US 12,107,321 B2
(45) Date of Patent: Oct. 1, 2024

(54) ANTENNA AND ELECTRONIC DEVICE INCLUDING SAME

(71) Applicant: Samsung Electronics Co., Ltd., Gyeonggi-do (KR)

(72) Inventors: Keumsu Song, Gyeonggi-do (KR); Younghak Sin, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 17/568,002

(22) Filed: Jan. 4, 2022

(65) Prior Publication Data

US 2022/0216594 A1 Jul. 7, 2022

Related U.S. Application Data

(63) Continuation of application No. PCT/KR2021/018673, filed on Dec. 9, 2021.

(30) Foreign Application Priority Data

Dec. 31, 2020 (KR) ........................ 10-2020-0188778

(51) Int. Cl.
*H01Q 1/24* (2006.01)
*H01Q 1/38* (2006.01)
*H01Q 15/24* (2006.01)

(52) U.S. Cl.
CPC ............... *H01Q 1/243* (2013.01); *H01Q 1/38* (2013.01); *H01Q 15/24* (2013.01)

(58) Field of Classification Search
CPC ........ H01Q 1/24; H01Q 1/243; H01Q 1/1221; H01Q 1/2283; H01Q 1/38; H01Q 1/405;
(Continued)

(56) References Cited

U.S. PATENT DOCUMENTS

2011/0186325 A1 8/2011 Myers et al.
2017/0294705 A1 10/2017 Khripkov et al.
(Continued)

FOREIGN PATENT DOCUMENTS

JP 2016-86260 A 5/2016
KR 10-2017-0064000 A 6/2017
(Continued)

OTHER PUBLICATIONS

International Search Report dated Mar. 21, 2022.
Written Opinion dated Mar. 18, 2022.

*Primary Examiner* — Thai Pham
(74) *Attorney, Agent, or Firm* — Cha & Reiter, LLC

(57) ABSTRACT

According to an embodiment of this disclosure, an electronic device comprises: a housing including a non-conductive portion; an antenna structure arranged in the housing, wherein the antenna structure includes: a substrate including a first substrate surface facing a first direction and a second substrate surface facing opposite the first substrate surface; and at least one antenna element arranged on the substrate to form a beam pattern in the first direction; a conductive member including a plurality of first slits arranged in an inner space of the housing to at least partially face the second substrate surface and formed at a position where the plurality of first slits at least partially overlap the at least one antenna element when the first substrate surface is viewed from above; and a wireless communication circuit configured to transmit or receive a wireless signal in a predetermined frequency band through the at least one antenna element.

15 Claims, 31 Drawing Sheets

(58) Field of Classification Search
CPC ...... H01Q 9/0407; H01Q 9/045; H01Q 15/24; H01Q 21/08; H01Q 21/24
See application file for complete search history.

(56) References Cited

U.S. PATENT DOCUMENTS

| | | | | |
|---|---|---|---|---|
| 2018/0358686 | A1* | 12/2018 | Park | H01Q 21/08 |
| 2019/0006731 | A1 | 1/2019 | Chiu | |
| 2019/0312334 | A1 | 10/2019 | Shin et al. | |
| 2020/0014119 | A1* | 1/2020 | Kim | H01Q 1/523 |
| 2020/0203804 | A1 | 6/2020 | Khripkov et al. | |
| 2020/0266521 | A1* | 8/2020 | Jeong | H01Q 1/243 |
| 2020/0358203 | A1 | 11/2020 | Park et al. | |
| 2020/0365973 | A1 | 11/2020 | Jeon et al. | |
| 2021/0210869 | A1* | 7/2021 | Lee | H01Q 21/062 |
| 2022/0029298 | A1 | 1/2022 | Huang et al. | |
| 2022/0069437 | A1 | 3/2022 | Yoo et al. | |
| 2022/0376380 | A1* | 11/2022 | Park | H01Q 3/26 |

FOREIGN PATENT DOCUMENTS

| | | | |
|---|---|---|---|
| KR | 10-2017-0116558 | A | 10/2017 |
| KR | 10-2018-0134528 | A | 12/2018 |
| KR | 10-2020-0008647 | A | 1/2020 |
| KR | 10-2020-0099813 | A | 8/2020 |
| KR | 10-2020-0110061 | A | 9/2020 |
| KR | 10-2020-0130028 | A | 11/2020 |
| KR | 10-2020-0131775 | A | 11/2020 |
| WO | 2020/101043 | A1 | 5/2020 |
| WO | 2020/119010 | A1 | 6/2020 |

* cited by examiner

ANTENNA AND ELECTRONIC DEVICE INCLUDING SAME

CROSS REFERENCE TO RELATED APPLICATION(S)

This application is a continuation application, claiming priority under § 365(c), of an International application No. PCT/KR2021/018673, filed on Dec. 9, 2021, which is based on and claims the benefit of a Korean patent application number 10-2020-01887778, filed on Dec. 31, 2020, in the Korean Intellectual Property Office, the disclosures of which is incorporated by reference herein in its entirety.

TECHNICAL FIELD

Certain embodiments of the disclosure relate to an antenna and an electronic device including the same.

BACKGROUND ART

Electronic devices (for example, electronics device for communication) are widely used in daily life with the development of wireless communication technologies. Network are gradually reaching capacity limits as a result abrupt increases in bandwidth use. In order to satisfy wireless data traffic demands that have been increasing since commercialization of 4G ($4^{th}$ generation) communication systems, there has been research regarding a communication system (for example, 5G ($5^{th}$ generation), pre-5G communication system, or new radio (NR)) that transmits and/or receives signals by using a high-frequency (for example, mmWave) band (for example, 3 GHz-300 GHz band).

The next-generation wireless communication technology can transmit and receive wireless signals using a frequency substantially in the range of about 3 GHz to 100 GHz. An efficient mounting structure and a new antenna structure (e.g., an antenna module) corresponding thereto can overcome high free-space loss due to frequency characteristics and to increase the gain of an antenna. The antenna structure may include an array antenna in which a variable number of antenna elements (e.g., conductive patches and/or conductive patterns) are arranged at regular intervals. These antenna elements may be arranged such that a beam pattern is formed in any one direction inside the electronic device. For example, the antenna structure may be arranged such that a beam pattern is formed toward at least a portion of the front surface, the rear surface, and/or the side surface in the inner space of the electronic device.

The electronic device may include a conductive portion (e.g., a metal member) arranged on at least a portion of the housing and a non-conductive portion (e.g., a polymer member) coupled to the conductive portion to reinforce rigidity and form a beautiful appearance. The conductive portion may be at least partially omitted in a portion facing the antenna structure arranged in the inner space of the electronic device, and the omitted portion may be replaced with a non-conductive portion.

However, eddy current (e.g., trap current) may be generated in a conductive portion located near the antenna structure and forming a boundary region by being coupled to the non-conductive portion. Eddy currents can include loops of electrical current induced within conductors by a changing magnetic field in the conductor. As a result, the radiation performance of the antenna structure may be deteriorated. In order to solve this problem, the non-conductive portion coupled to the conductive part may extend to a position relatively far from the antenna structure, but this may cause a decrease in rigidity of the electronic device.

SUMMARY

Certain embodiments of the disclosure are able to provide an antenna configured to suppress radiation performance degradation through a support structure of an antenna structure and an electronic device including the same.

According to certain embodiments, it is possible to provide an antenna and an electronic device including the same, wherein the antenna can be capable of suppressing radiation performance degradation even when a conductive portion is arranged in the vicinity of an antenna structure. This is helpful for reinforcing rigidity of the electronic device.

According to an embodiment of this disclosure, an electronic device comprises: a housing including a non-conductive portion; an antenna structure arranged in the housing, wherein the antenna structure includes: a substrate including a first substrate surface facing a first direction and a second substrate surface facing opposite the first substrate surface; and at least one antenna element arranged on the substrate to form a beam pattern in the first direction; a conductive member including a plurality of first slits arranged in an inner space of the housing to at least partially face the second substrate surface and formed at a position where the plurality of first slits at least partially overlap the at least one antenna element when the first substrate surface is viewed from above; and a wireless communication circuit configured to transmit or receive a wireless signal in a predetermined frequency band through the at least one antenna element, wherein the at least one antenna element is arranged to at least partially overlap the non-conductive portion when the housing is viewed from outside.

According to another embodiments, as electronic device comprises: a housing including a conductive portion forming at least a portion of a side surface, and a remaining portion; a wireless communication circuit arranged in an inner space of the housing; and an antenna structure arranged in the inner space, wherein the antenna structure includes: a substrate; and an antenna structure including at least one antenna element arranged on a substrate surface; a conductive member including a plurality of slits arranged in an inner space of the housing to at least partially face the opposite substrate surface and formed at a position at which the slits at least partially overlap the at least one antenna element when the substrate surface is viewed from above; and a wireless communication circuit configured to transmit or receive a wireless signal in a predetermined frequency band through the at least one antenna element, wherein the antenna structure is arranged at a position at which the remaining portion fully overlaps the antenna structure when the side surface is viewed from outside, and wherein the at least one antenna element is configured to form a beam in a direction towards the remaining portion.

The antenna structure according to an embodiment of the disclosure can have a plurality of slits formed in the conductive member supporting the substrate so that radiation performance degradation of an antenna can be suppressed by reducing or eliminating eddy current generated in a boundary region between the conductive portion and the non-conductive portion of the housing. In addition, since the conductive portion of the housing can be arranged up to the vicinity of the antenna structure through the plurality of slits formed in the conductive member supporting the substrate, the antenna structure can be helpful for reinforcing the rigidity of the electronic device.

In addition, various effects directly or indirectly identified through this document may be provided.

BRIEF DESCRIPTION OF DRAWINGS

In connection with the description of the drawings, the same or similar components may be denoted by the same or similar reference numerals.

DETAILED DESCRIPTION

Figure 1:
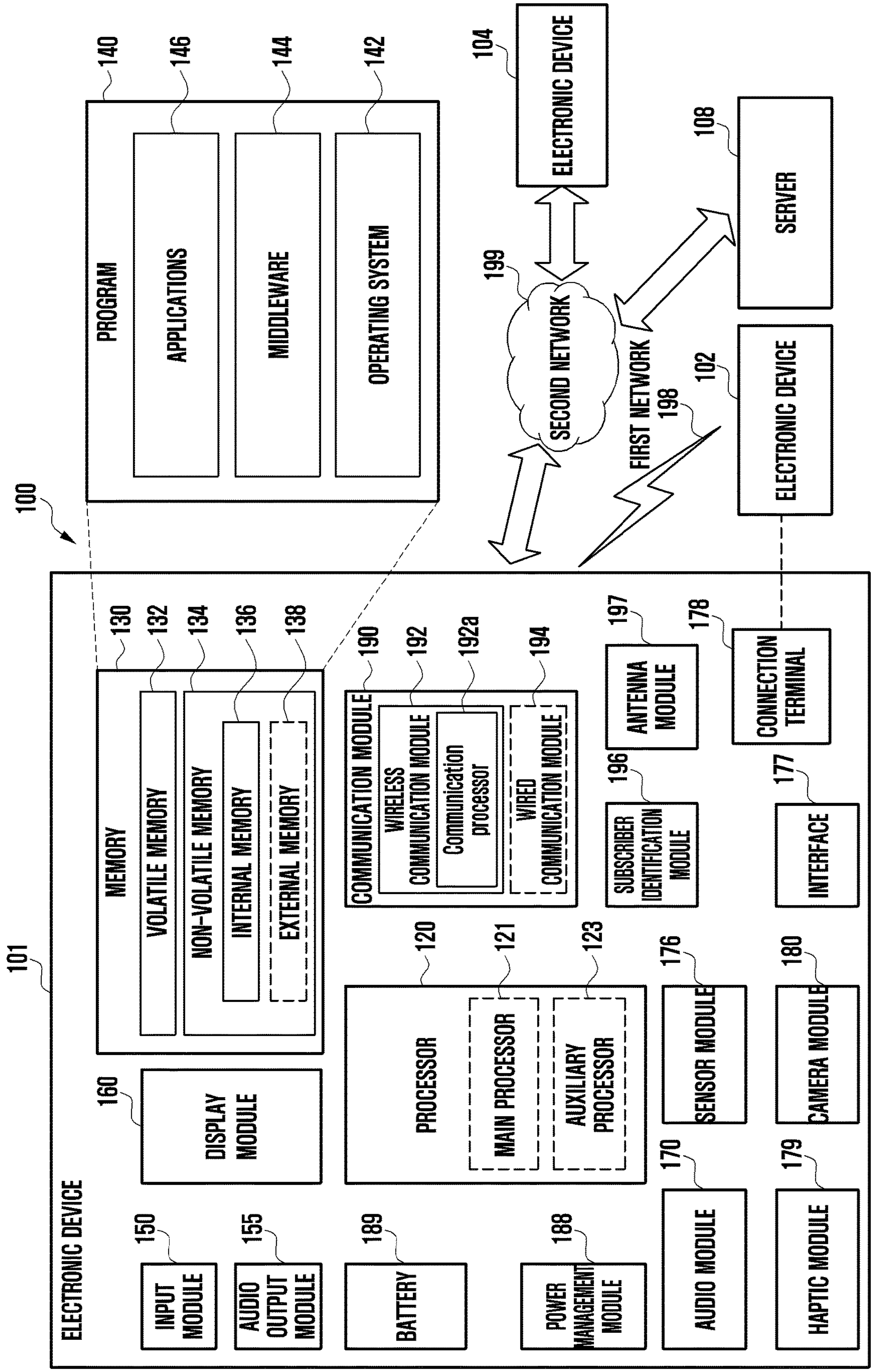
FIG. 1 is a block diagram of an electronic device according to certain embodiments of the disclosure in a network environment.

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
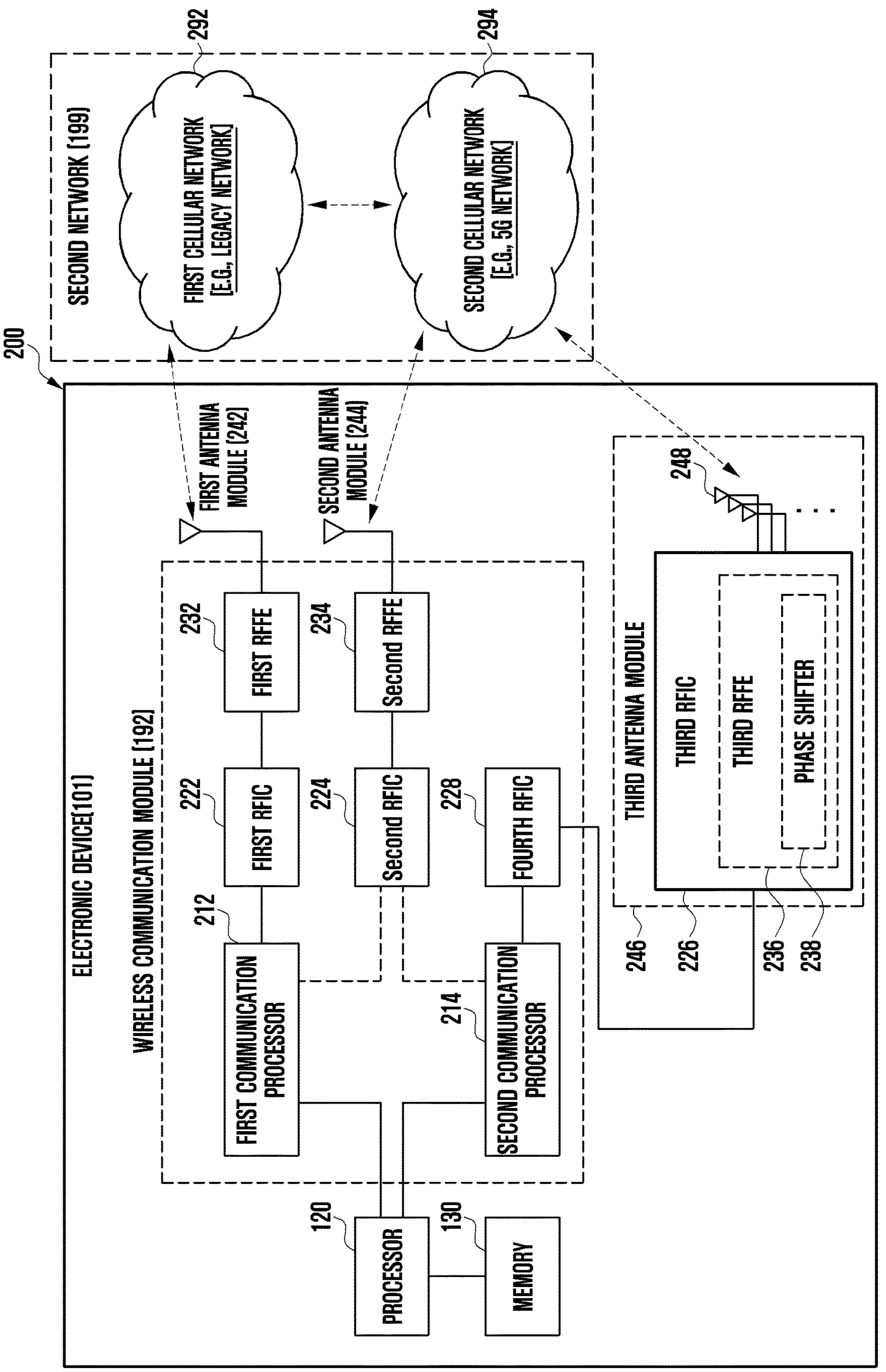
FIG. 2 is a block diagram of an electronic device configured to support a legacy network communication and a 5G network communication, according to certain embodiments of the disclosure.

FIG. 2 is a block diagram illustrating an electronic device in a network environment including a plurality of cellular networks according to an embodiment of the disclosure.

Referring to FIG. 2, the electronic device 101 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to certain embodiments, the first cellular network may be a legacy network including a second generation (2G), 3G, 4G, or long term evolution (LTE) network. The second communication processor 214 may establish a communication channel corresponding to a designated band (e.g., about 6 GHz to about 60 GHz) of bands to be used for wireless communication with the second cellular network 294, and support 5G network communication through the established communication channel. According to certain embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to certain embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
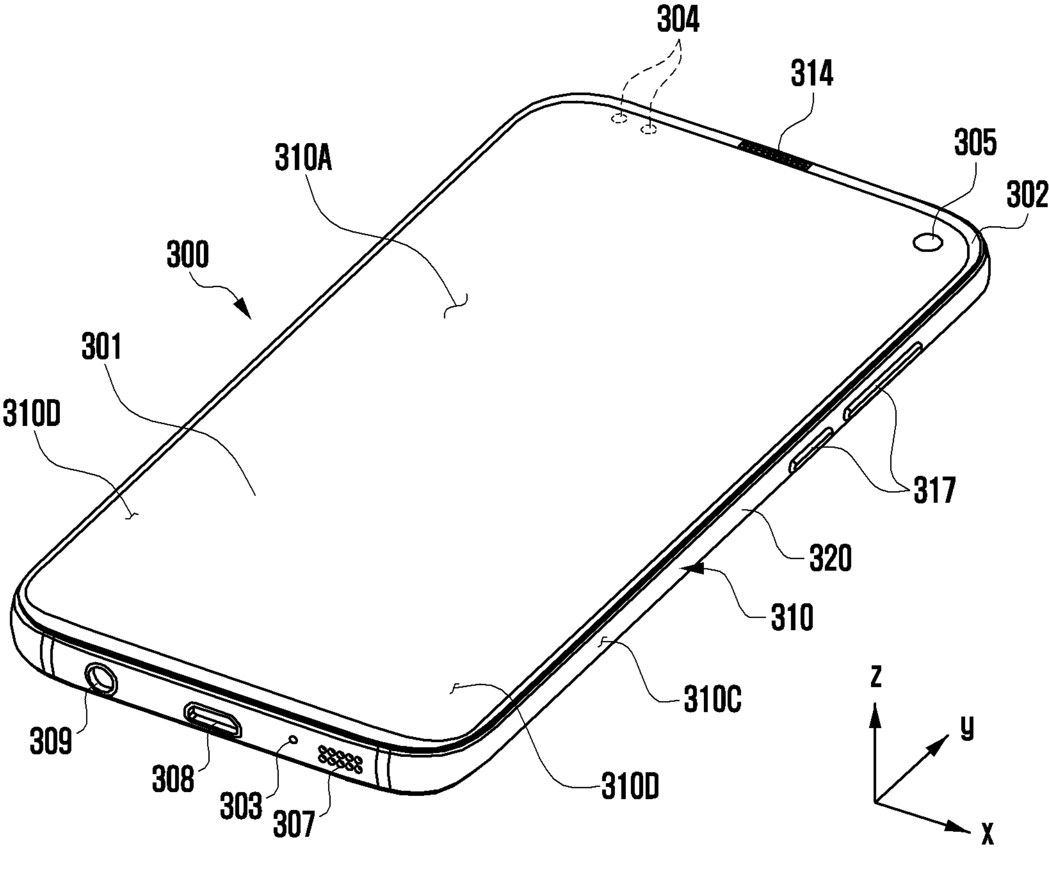
FIG. 3A is a perspective view of a mobile electronic device according to certain embodiments of the disclosure.
Figure 3B:
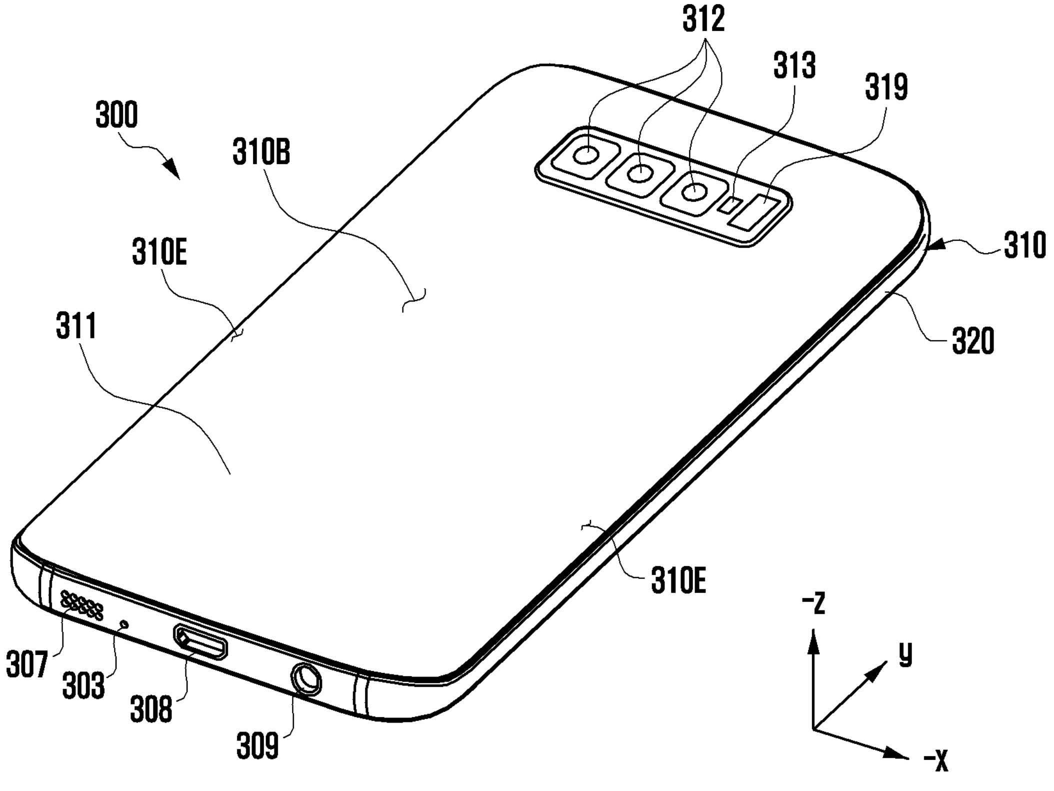
FIG. 3B is a rear perspective view of the mobile electronic device according to certain embodiments of the disclosure.

FIG. 3A illustrates a perspective view showing a front surface of a mobile electronic device according to an embodiment of the disclosure, and FIG. 3B illustrates a perspective view showing a rear surface of the mobile electronic device shown in FIG. 3A according to an embodiment of the disclosure.

The electronic device 300 in FIGS. 3A and 3B may be at least partially similar to the electronic device 101 in FIG. 1 or may further include other embodiments.

Referring to FIGS. 3A and 3B, a mobile electronic device 300 may include a housing 310 that includes a first surface (or front surface) 310A, a second surface (or rear surface) 310B, and a lateral surface 310C that surrounds a space between the first surface 310A and the second surface 310B. The housing 310 may refer to a structure that forms a part of the first surface 310A, the second surface 310B, and the lateral surface 310C. The first surface 310A may be formed of a front plate 302 (e.g., a glass plate or polymer plate coated with a variety of coating layers) at least a part of which is substantially transparent. The second surface 310B may be formed of a rear plate 311 which is substantially opaque. The rear plate 311 may be formed of, for example, coated or colored glass, ceramic, polymer, metal (e.g., aluminum, stainless steel (STS), or magnesium), or any combination thereof. The lateral surface 310C may be formed of a lateral bezel structure (or "lateral member") 318 which is combined with the front plate 302 and the rear plate 311 and includes a metal and/or polymer. The rear plate 311 and the lateral bezel structure 318 may be integrally formed and may be of the same material (e.g., a metallic material such as aluminum).

The front plate 302 may include two first regions 310D disposed at long edges thereof, respectively, and bent and extended seamlessly from the first surface 310A toward the rear plate 311. Similarly, the rear plate 311 may include two second regions 310E disposed at long edges thereof, respectively, and bent and extended seamlessly from the second surface 310B toward the front plate 302. The front plate 302 (or the rear plate 311) may include only one of the first regions 310D (or of the second regions 310E). The first regions 310D or the second regions 310E may be omitted in part. When viewed from a lateral side of the mobile electronic device 300, the lateral bezel structure 318 may have a first thickness (or width) on a lateral side where the first region 310D or the second region 310E is not included, and may have a second thickness, being less than the first thickness, on another lateral side where the first region 310D or the second region 310E is included.

The mobile electronic device 300 may include at least one of a display 301, audio modules 303, 307 and 314, sensor modules 304 and 319, camera modules 305, 312 and 313, a key input device 317, a light emitting device, and connector holes 308 and 309. The mobile electronic device 300 may omit at least one (e.g., the key input device 317 or the light emitting device) of the above components, or may further include other components.

The display 301 may be exposed through a substantial portion of the front plate 302, for example. At least a part of the display 301 may be exposed through the front plate 302 that forms the first surface 310A and the first region 310D of the lateral surface 310C. Outlines (i.e., edges and corners) of the display 301 may have substantially the same form as those of the front plate 302. The spacing between the outline of the display 301 and the outline of the front plate 302 may be substantially unchanged in order to enlarge the exposed area of the display 301.

The audio modules 303, 307 and 314 may correspond to a microphone hole 303 and speaker holes 307 and 314, respectively. The microphone hole 303 may contain a microphone disposed therein for acquiring external sounds and, in a case, contain a plurality of microphones to sense a sound direction. The speaker holes 307 and 314 may be classified into an external speaker hole 307 and a call receiver hole 314. The microphone hole 303 and the speaker holes 307 and 314 may be implemented as a single hole, or a speaker (e.g., a piezo speaker) may be provided without the speaker holes 307 and 314.

The sensor modules 304 and 319 may generate electrical signals or data corresponding to an internal operating state of the mobile electronic device 300 or to an external environmental condition. The sensor modules 304 and 319 may include a first sensor module 304 (e.g., a proximity sensor) and/or a second sensor module (e.g., a fingerprint sensor) disposed on the first surface 310A of the housing 310, and/or a third sensor module 319 (e.g., a heart rate monitor (HRM) sensor) and/or a fourth sensor module (e.g., a fingerprint sensor) disposed on the second surface 310B of the housing 310. The fingerprint sensor may be disposed on the second surface 310B as well as the first surface 310A (e.g., the display 301) of the housing 310. The electronic device 300 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312 and 313 may include a first camera device 305 disposed on the first surface 310A of the electronic device 300, and a second camera module 312 and/or a flash 313 disposed on the second surface 310B. The camera module 305 or the camera module 312 may include one or more lenses, an image sensor, and/or an image signal processor. The flash 313 may include, for example, a light emitting diode or a xenon lamp. Two or more lenses (infrared cameras, wide angle and telephoto lenses) and image sensors may be disposed on one side of the electronic device 300.

The key input device 317 may be disposed on the lateral surface 310C of the housing 310. The mobile electronic device 300 may not include some or all of the key input device 317 described above, and the key input device 317 which is not included may be implemented in another form such as a soft key on the display 301. The key input device 317 may include the sensor module disposed on the second surface 310B of the housing 310.

The light emitting device may be disposed on the first surface 310A of the housing 310. For example, the light emitting device may provide status information of the electronic device 300 in an optical form. The light emitting device may provide a light source associated with the operation of the camera module 305. The light emitting device may include, for example, a light emitting diode (LED), an IR LED, or a xenon lamp.

The connector holes 308 and 309 may include a first connector hole 308 adapted for a connector (e.g., a universal serial bus (USB) connector) for transmitting and receiving power and/or data to and from an external electronic device, and/or a second connector hole 309 adapted for a connector (e.g., an earphone jack) for transmitting and receiving an audio signal to and from an external electronic device.

Some modules 305 of camera modules 305 and 312, some sensor modules 304 of sensor modules 304 and 319, or an indicator may be arranged to be exposed through a display 301. For example, the camera module 305, the sensor module 304, or the indicator may be arranged in the internal space of an electronic device 300 so as to be brought into contact with an external environment through an opening of the display 301, which is perforated up to a front plate 302. In another embodiment, some sensor modules 304 may be arranged to perform their functions without being visually exposed through the front plate 302 in the internal space of the electronic device. For example, in this case, an area of the display 301 facing the sensor module may not require a perforated opening.

Figure 3C:
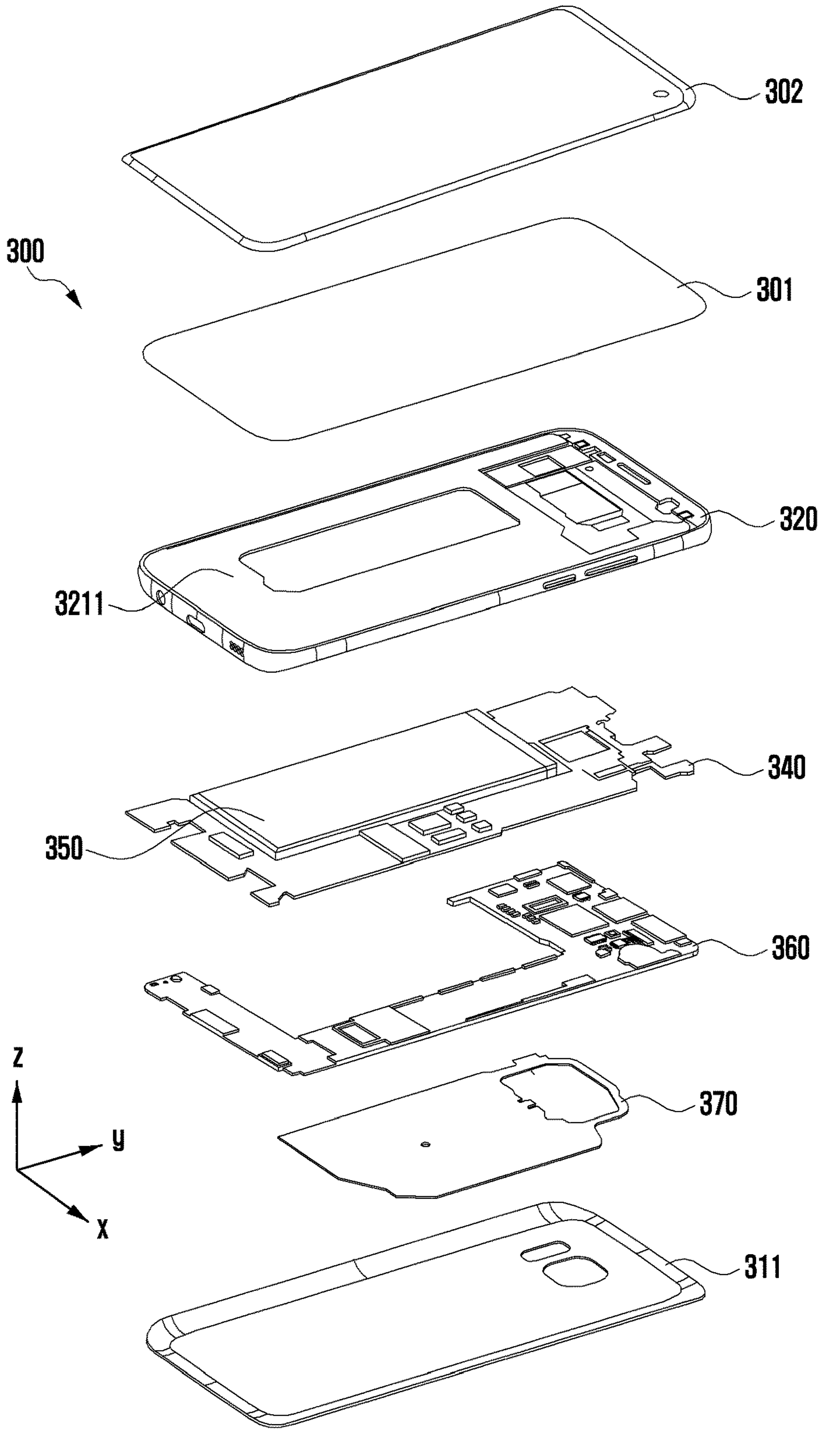
FIG. 3C is an exploded perspective view of the mobile electronic device according to certain embodiments of the disclosure.

FIG. 3C illustrates an exploded perspective view showing a mobile electronic device shown in FIG. 3A according to an embodiment of the disclosure.

Referring to FIG. 3C a mobile electronic device 300 may include a lateral bezel structure 320, a first support member 3211 (e.g., a bracket), a front plate 302, a display 301, an electromagnetic induction panel (not shown), a printed circuit board (PCB) 340, a battery 350, a second support member 360 (e.g., a rear case), an antenna 370, and a rear plate 311. The mobile electronic device 300 may omit at least one (e.g., the first support member 3211 or the second support member 360) of the above components or may further include another component. Some components of the electronic device 300 may be the same as or similar to those of the mobile electronic device 101 shown in FIG. 3*a* or FIG. 3*b*, thus, descriptions thereof are omitted below.

The first support member 3211 is disposed inside the mobile electronic device 300 and may be connected to, or integrated with, the lateral bezel structure 320. The first support member 3211 may be formed of, for example, a metallic material and/or a non-metal (e.g., polymer) material. The first support member 3211 may be combined with the display 301 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 311 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 320 and/or the first support member 3211.

Figure 4A:
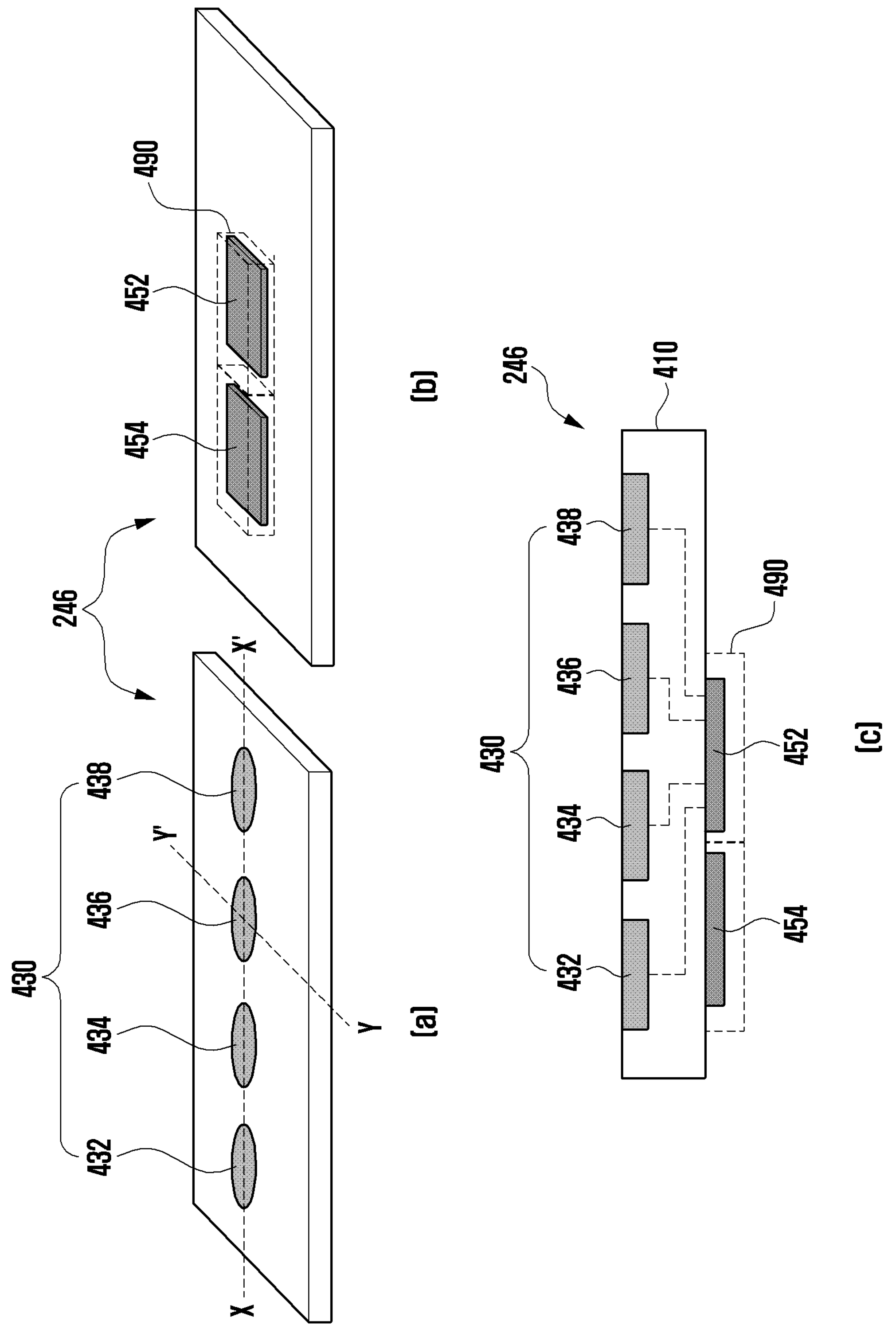
FIG. 4A is a view illustrating an embodiment of the structure of a third antenna module described with reference to FIG. 2, according to certain embodiments of the disclosure.

FIG. 4A is a diagram illustrating a structure of, for example, a third antenna module described with reference to FIG. 2 according to an embodiment of the disclosure. FIG. 4A(a) is a perspective view illustrating the third antenna module 246 viewed from one side, and FIG. 4A(b) is a perspective view illustrating the third antenna module 246 viewed from the other side. FIG. 4A(c) is a cross-sectional view illustrating the third antenna module 246 taken along line X-X' of FIG. 4A.

With reference to FIG. 4A, in one embodiment, the third antenna module 246 may include a printed circuit board 410, an antenna array 430, a RFIC 452, and a PMIC 454. Alternatively, the third antenna module 246 may further include a shield member 490. In other embodiments, at least one of the above-described components may be omitted or at least two of the components may be integrally formed.

The printed circuit board 410 may include a plurality of conductive layers and a plurality of non-conductive layers stacked alternately with the conductive layers. The printed circuit board 410 may provide electrical connections between the printed circuit board 410 and/or various electronic components disposed outside using wirings and conductive vias formed in the conductive layer.

The antenna array 430 (e.g., 248 of FIG. 2) may include a plurality of antenna elements 432, 434, 436, or 438 disposed to form a directional beam. As illustrated, the antenna elements 432, 434, 436, or 438 may be formed at a first surface of the printed circuit board 410. According to another embodiment, the antenna array 430 may be formed inside the printed circuit board 410. According to the embodiment, the antenna array 430 may include the same or a different shape or kind of a plurality of antenna arrays (e.g., dipole antenna array and/or patch antenna array).

The RFIC 452 (e.g., the third RFIC 226 of FIG. 2) may be disposed at another area (e.g., a second surface opposite to the first surface) of the printed circuit board 410 spaced apart from the antenna array. The RFIC 452 is configured to process signals of a selected frequency band transmitted/received through the antenna array 430. According to one embodiment, upon transmission, the RFIC 452 may convert a baseband signal obtained from a communication processor (not shown) to an RF signal of a designated band. Upon reception, the RFIC 452 may convert an RF signal received through the antenna array 430 to a baseband signal and transfer the baseband signal to the communication processor.

According to another embodiment, upon transmission, the RFIC 452 may up-convert an IF signal (e.g., about 9 GHz to about 11 GHz) obtained from an intermediate frequency integrate circuit (IFIC) (e.g., 228 of FIG. 2) to an RF signal of a selected band. Upon reception, the RFIC 452 may down-convert the RF signal obtained through the antenna array 430, convert the RF signal to an IF signal, and transfer the IF signal to the IFIC.

The PMIC 454 may be disposed in another partial area (e.g., the second surface) of the printed circuit board 410 spaced apart from the antenna array 430. The PMIC 454 may receive a voltage from a main PCB (not illustrated) to provide power necessary for various components (e.g., the RFIC 452) on the antenna module.

The shielding member 490 may be disposed at a portion (e.g., the second surface) of the printed circuit board 410 so as to electromagnetically shield at least one of the RFIC 452 or the PMIC 454. According to one embodiment, the shield member 490 may include a shield can.

Although not shown, in certain embodiments, the third antenna module 246 may be electrically connected to another printed circuit board (e.g., main circuit board) through a module interface. The module interface may include a connecting member, for example, a coaxial cable connector, board to board connector, interposer, or flexible printed circuit board (FPCB). The RFIC 452 and/or the PMIC 454 of the antenna module may be electrically connected to the printed circuit board through the connection member.

Figure 4B:
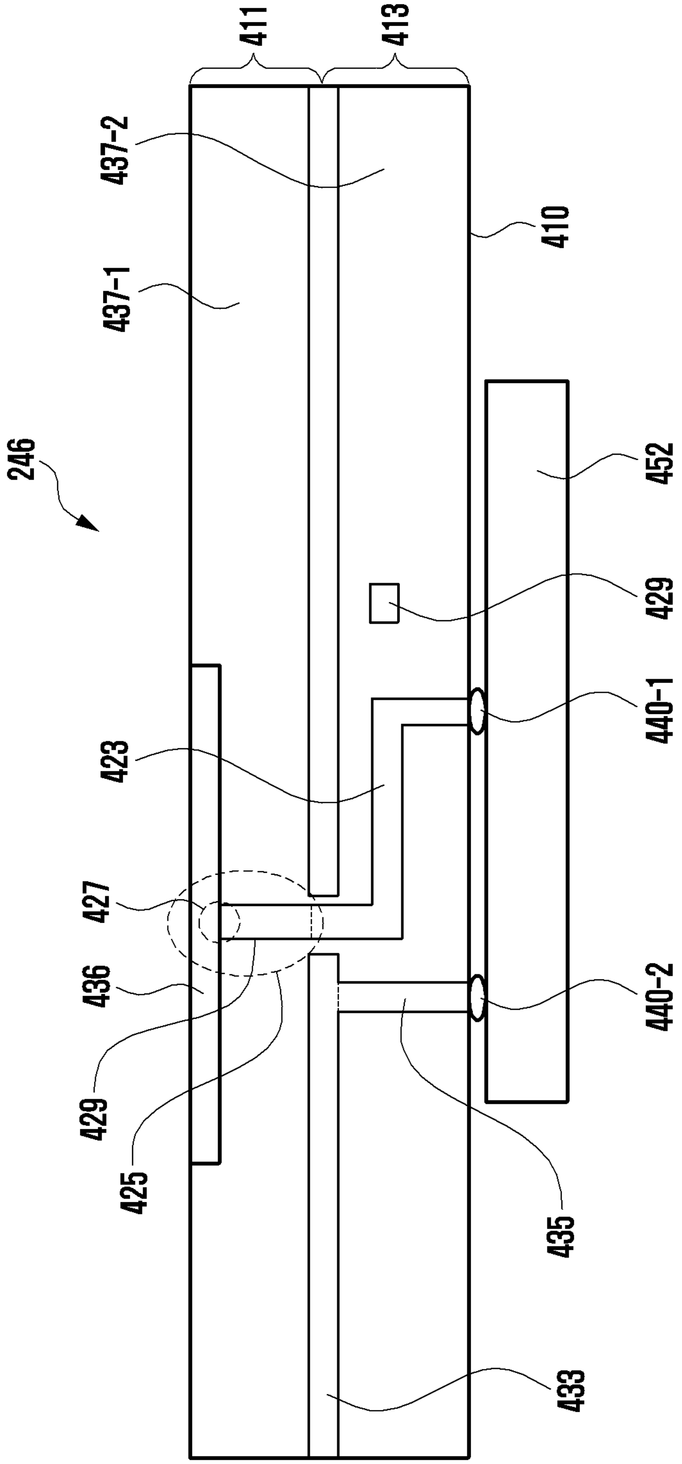
FIG. 4B is a cross-sectional view of the third antenna module according to certain embodiments of the disclosure illustrated in (a) of FIG. 4A taken along line Y-Y'.

FIG. 4B is a cross-sectional view illustrating the third antenna module 246 taken along line Y-Y' of FIG. 4A(a) according to an embodiment of the disclosure. The printed circuit board 410 of the illustrated embodiment may include an antenna layer 411 and a network layer 413.

Referring to FIG. 4B, the antenna layer 411 may include at least one dielectric layer 437-1, and an antenna element 436 and/or a power feeding portion 425 formed on or inside an outer surface of a dielectric layer. The power feeding portion 425 may include a power feeding point 427 and/or a power feeding line 429.

The network layer 413 may include at least one dielectric layer 437-2, at least one ground layer 433, at least one conductive via 435, a transmission line 423, and/or a power feeding line 429 formed on or inside an outer surface of the dielectric layer.

Further, in the illustrated embodiment, the RFIC 452 (e.g., the third RFIC 226 of FIG. 2) of FIG. 4A(c) may be electrically connected to the network layer 413 through, for example, first and second solder bumps 440-1 and 440-2. In other embodiments, various connection structures (e.g., solder or ball grid array (BGA)) instead of the solder bumps may be used. The RFIC 452 may be electrically connected to the antenna element 436 through the first solder bump 440-1, the transmission line 423, and the power feeding portion 425. The RFIC 452 may also be electrically connected to the ground layer 433 through the second solder bump 440-2 and the conductive via 435. Although not illustrated, the RFIC 452 may also be electrically connected to the above-described module interface through the power feeding line 429.

Figure 5A:
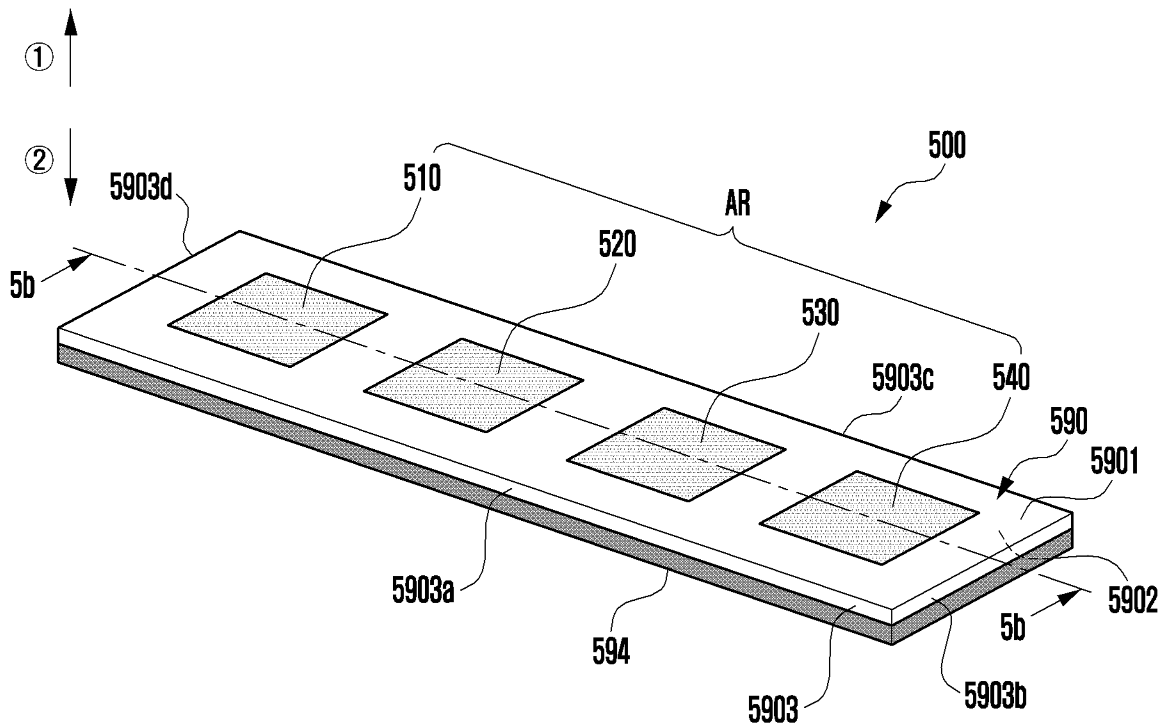
FIG. 5A is a perspective view of an antenna structure according to certain embodiments of the disclosure.
Figure 5B:
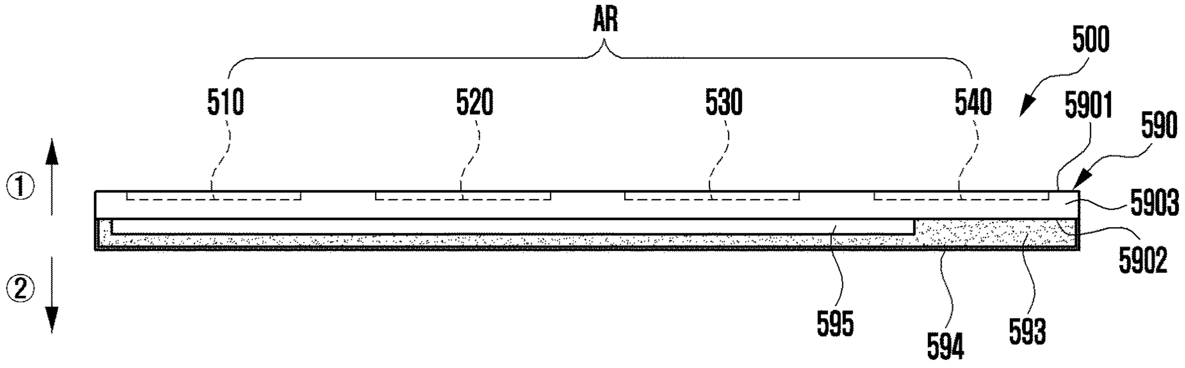
FIG. 5B is a cross-sectional view of the antenna structure according to certain embodiments of the disclosure taken along line 5*b*-5*b* in FIG. 5A.

FIG. 5A is a perspective view of an antenna structure according to certain embodiments of the disclosure. FIG. 5B is a cross-sectional view of the antenna structure according to certain embodiments of the disclosure taken along line 5*b*-5*b* in FIG. 5A.

The antenna structure 500 of FIGS. 5A and 5B may be at least partially similar to the third antenna module 246 of FIG. 2, or may further include other embodiments of the antenna structure.

Referring to FIGS. 5A and 5B, the antenna structure 500 (e.g., an antenna module) may include an array antenna (AR) including a plurality of conductive patches 510, 520, 530, and 540 as antenna elements. According to an embodiment, the plurality of conductive patches 510, 520, 530, and 540 may be arranged on a substrate 590 (e.g., a printed circuit board). The substrate 590 may include a first substrate surface and a second substrate surface. The first substrate surface can be oriented in a first direction (direction ①), and the second substrate surface 5902 can be oriented in a direction (direction ②) that is opposite to the first substrate surface 5901.

The substrate can also include substrate side-surface 5903. The substrate side-surface 5903 surrounds the space between the first substrate surface 5901 and the second substrate surface 5902. According to an embodiment, the plurality of conductive patches 510, 520, 530, and 540 may be exposed on the substrate surface 5901 or may be inserted into the substrate 590, and may be configured to form a beam pattern in the first direction (direction ①).

The substrate side-surface 5903 may include a first substrate side-surface 5903*a* having a first length, a second substrate side-surface 5903*b* extending from the first substrate side-surface 5903*a* perpendicularly to the same and having a second length shorter than the first length, a third substrate side-surface 5903*c* extending from the second substrate side-surface 5903*b* parallel to the first substrate side-surface 5903*a* and having a first length, and a fourth substrate side-surface 5903*d* extending from the third substrate side-surface 5903*c* parallel to the substrate side-surface 5903*b* and having a second length. Although the substrate is described as rectangular, it is noted that in other embodiments, other shapes can also be used.

Figure 7A:
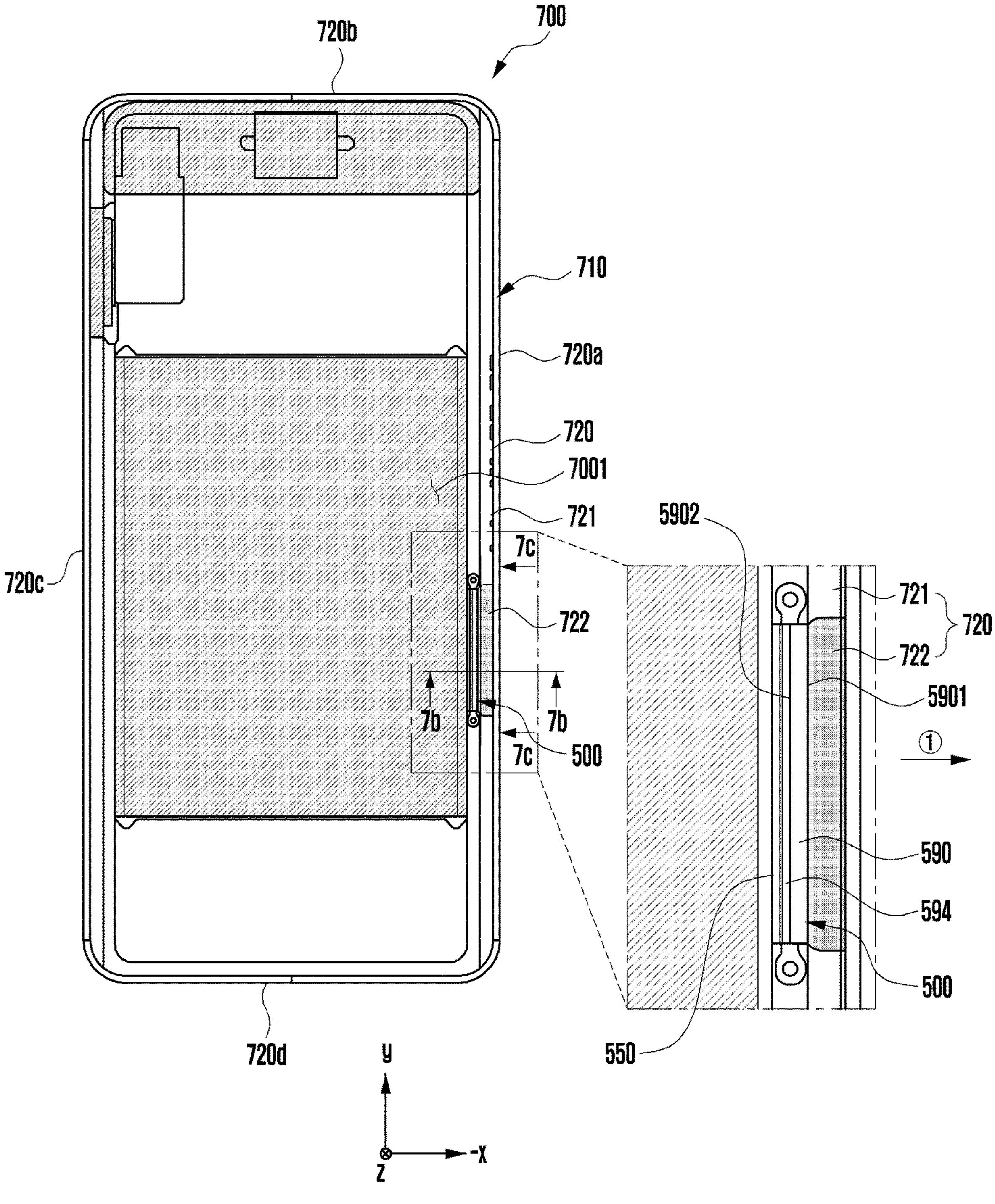
FIG. 7A is a view illustrating a configuration of a portion of an electronic device illustrating an arrangement structure of an antenna structure to which a conductive member according to certain embodiments of the disclosure is applied.
Figure 7B:
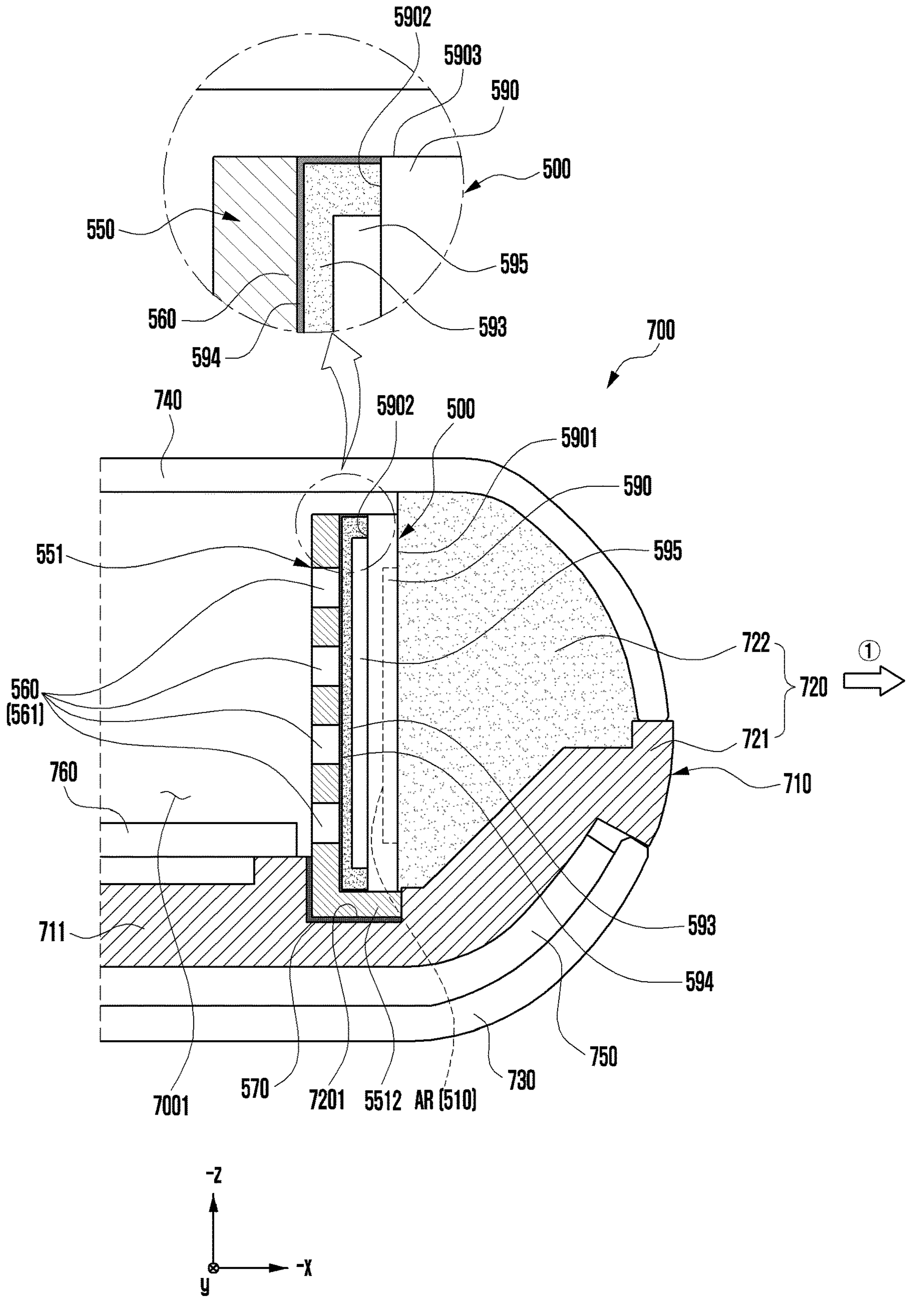
FIG. 7B is a partial cross-sectional view of the electronic device according to certain embodiments of the disclosure taken along line 7*b*-7*b* in FIG. 7A.

The antenna structure 500 may be arranged in an inner space (e.g., the inner space 7001 in FIG. 7B) of an electronic device (e.g., the electronic device 700 in FIG. 7B) such that at least one of the substrate side-surfaces 5903*a*, 5903*b*, 5903*c*, and 5903*d* of the substrate 590 corresponds to a housing (e.g., the housing 710 in FIG. 7B). For example, the length of second substrate side-surface 5903*b* and fourth substrate side-surface 5903*d* can correspond to the thickness of the electronic device.

The antenna structure 500 may include a wireless communication circuit 595 arranged on the second substrate surface 5902. The plurality of conductive patches 510, 520, 530, and 540 may be electrically connected to the wireless communication circuit 595 via a wiring structure (not illustrated) of the substrate. The wireless communication circuit 595 may be configured to transmit and/or receive a radio frequency in the range of about 3 GHz to about 100 GHz through the array antenna AR.

In some embodiments, the wireless communication circuit 595 may be arranged in the inner space (e.g., the inner space 7001 in FIG. 7B) of the electronic device (e.g., the electronic device 700 in FIG. 7B) at a position spaced apart from the substrate 590 and may be electrically connected to the substrate 590 via an electrical connection member (e.g., an FPCB). For example, the wireless communication circuit 595 may be arranged on a main board (e.g., the main board 760 in FIG. 7B) of the electronic device (e.g., the electronic device 700 in FIG. 7B).

The plurality of conductive patches 510, 520, 530, and 540 may include a first conductive patch 510, a second conductive patch 520, a third conductive patch 530, or a fourth conductive patch 540 arranged at a predetermined interval on the substrate surface 5901 of the substrate 590 or in a region located inside the substrate 590 adjacent to the substrate surface 5901. According to an embodiment, the conductive patches 510, 520, 530, and 540 may have substantially the same shape. Although the antenna structure 500 according to exemplary embodiments of the disclosure has been illustrated and described with reference to an array antenna AR including four conductive patches 510, 520, 530, and 540, the disclosure is not limited thereto. For example, the antenna structure 500 may include one single conductive patch, or may include two or five or more conductive patches, as an array antenna (AR). In some embodiments, the antenna structure 500 may further include a plurality of conductive patterns (e.g., a dipole antenna) arranged on the substrate 590. In this case, the conductive patterns may be arranged such that a beam pattern is formed in a direction (e.g., a vertical direction) different from the direction of the beam pattern of the conductive patches 510, 520, 530, and 540.

The antenna structure 500 may include a protection member 583 arranged on the second substrate surface 5902. The protection member 583 may be arranged to at least partially surround the wireless communication circuit 595. The protection member 593 may include, as a protective layer, a dielectric that is arranged to surround the wireless communication circuit 595 and is cured and/or solidified after being applied. The protection member 593 may include an epoxy resin. The protection member 593 may be arranged to surround all or a part of the wireless communication circuit 595 on the second substrate surface 5902 of the substrate 590. The antenna structure 500 may include a conductive shield layer 594 laminated on at least the surface of the protection member 593. The conductive shield layer 594 may block a noise (e.g., a DC-DC noise or an interference frequency component) generated in the antenna structure 500 from spreading to the surroundings. The conductive shield layer 594 may include a conductive material applied to the surface of the protection member 593 through a thin film deposition method such as sputtering. The conductive shield layer 594 may be electrically connected to a ground of the substrate 590. In some embodiments, the conductive shield layer 594 may be arranged to extend to at least a portion of the substrate side-surface 5903 including the protection member 593. In some embodiments, the protection member 593 and/or the conductive shield layer 594 may be replaced with a shield can mounted on the substrate.

Figure 6:
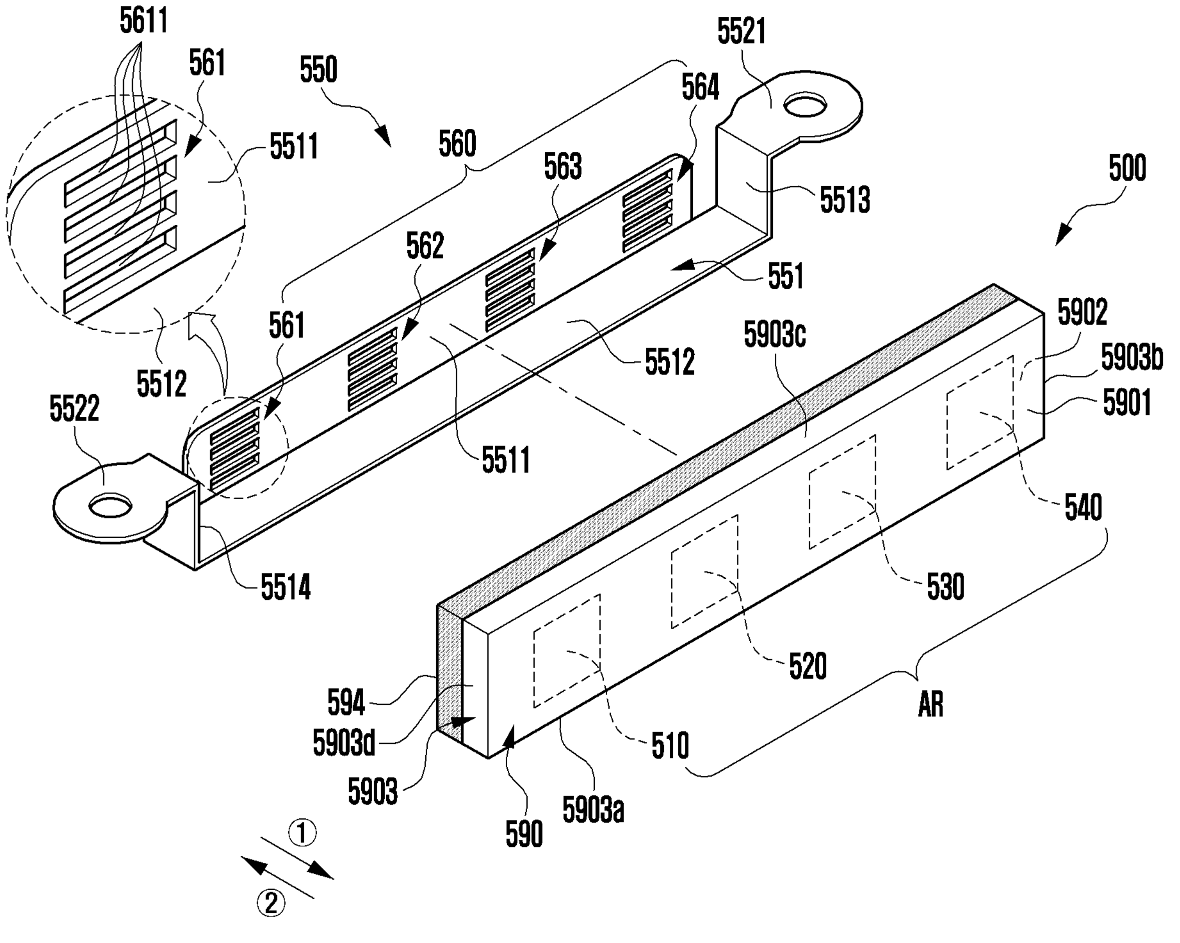
FIG. 6 is an exploded perspective view illustrating a state in which a conductive member is applied to an antenna structure according to certain embodiments of the disclosure.

FIG. 6 is an exploded perspective view illustrating a state in which a conductive member is applied to an antenna structure according to certain embodiments of the disclosure.

Referring to FIG. 6, an electronic device (e.g., the electronic device 700 of FIG. 7B) may include a conductive member 550. The conductive member 550 can be fixed to a conductive portion (e.g., the conductive portion 721 in FIG. 7B) of a housing (e.g., the housing 710 in FIG. 7B). An antenna structure 500 can be arranged to be at least partially supported via the conductive member 550. The conductive member 550 may be fixed to a conductive portion (e.g., the conductive portion 721 in FIG. 7B) of a support member (e.g., the support member 711 in FIG. 7B) formed as a portion of the housing (e.g., the housing 710 in FIG. 7B). The conductive member 550 may be helpful for reinforcing the rigidity of the antenna structure 500 by being at least partially in contact with the conductive portion (e.g., the conductive portion 721 in FIG. 7B) of the side member (e.g., the side member 720 in FIG. 7B) and may effectively diffuse heat by transferring heat generated from the antenna structure 500 to the conductive portion 721 of the housing 710. Accordingly, the conductive member 550 may be formed of a metal material (e.g., SUS, Cu, or Al) having suitable thermal conductivity and tensile strength or in excess of a threshold.

According to certain embodiments, the conductive member 550 may include a conductive plate 551 made of a metal and at least one extension 5521 or 5522. The at least one extension 5521 or 5522 can extend outward from the conductive plate 551 and are configured to be fixed to the conductive portion (e.g., the conductive portion 721 in FIG. 7B) of the housing (e.g., the housing 710 of FIG. 7B). The conductive plate 551 may include support positions. The support positions may include a first support portion 5511 correspondingly arranged to cover at least a portion of the second substrate surface 5902. A second support portion 5512 can extend from the first support portion 5511 and cover at least a portion of the first substrate side-surface 5903*a*. A third support portion 5513 can extend from one end of the second support portion 5512 and cover at least a portion of the second substrate side-surface 5903*b*.

A fourth support portion 5514 can extend from the other end of the second support portion 5512 and cover at least a portion of the fourth substrate side-surface 5903*d*.

The conductive plate 551 may further include a fifth support portion (not illustrated) extending from the first support portion 5511 and correspondingly arranged to cover the third substrate side-surface 5903*c*. The at least one extension 5521 or 5522 may include a first extension 5521 extending outward from the third support portion 5513 and a second extension 5522 extending outward from the fourth support portion 5514. The first extension 5521 and the second extension 5522 may be fixed to the conductive portion (e.g., conductive portion 721 in FIG. 7B) of the housing (e.g., the housing 710 in FIG. 7B) via fastening members such as screws (e.g., the screws S in FIG. 7C).

The conductive member 550 may include a plurality of first slits 560 (e.g., a plurality of first openings) formed in the first support portion 5511 corresponding to the second substrate surface 5902 of the substrate. Each one of the plurality of first slits 560 may be formed through a plurality of unit slits 5611 having a predetermined interval and length.

The plurality of first slits 560 may include first sub-slits 561 (e.g., a first pattern) formed at a position at which the first sub-slits 561 at least partially overlap the first conductive patch 510 when the first substrate surface 5901 is viewed from above, second sub-slits 562 (e.g., a second pattern) formed at a position at which the second sub-slits 562 at least partially overlap the second conductive patch 520 when the first substrate surface 5901 is viewed from above, third sub-slits 563 (e.g., a third pattern) formed at a position at which the third sub-slits 563 at least partially overlap the third conductive patch 530 when the first substrate surface 5901 is viewed from above, and fourth sub-slits 564 (e.g., a fourth pattern) formed at a position at which the fourth sub-slits 564 at least partially overlap the fourth conductive patch 540 when the first substrate surface 5901 is viewed from above. According to an embodiment, the first sub-slits 561, the second sub-slits 562, the third sub-slits 563, and the fourth sub-slits 564 may be arranged in groups at corresponding positions overlapping the conductive patches 510, 520, 530, and 540, respectively, through a plurality unit slits 5611 having a predetermined interval and length.

The antenna structure 500 may be arranged to form a beam pattern through a non-conductive portion (e.g., the non-conductive portion 722 in FIG. 7B) in the inner space (e.g., the inner space 7001 in FIG. 7B) of the electronic device (e.g., the housing 710 in FIG. 7B), and the non-conductive portion 722 may be coupled to a conductive portion 721. Accordingly, the housing 710 may include a boundary region between the conductive portion 721 and the non-conductive portion 722 near the region in which the antenna structure 500 is arranged, and some of the current applied to the antenna structure 500 (e.g., leakage current) may be excited (leaked) into the conductive portion of the boundary region. The foregoing acts as an eddy current (e.g. trap current). Eddy currents can degrade radiating performance.

The plurality of conductive first slits 560 may be helpful for reducing eddy currents This improves radiation performance of the antenna structure by making the path of eddy currents, which are out-of phase have a phase difference and inducing the phase, close to be in-phase. In some embodiments, the conductive member 550 may be arranged in the vicinity of the antenna structure 550 to be at least partially in contact with or proximate to the substrate 590 and may be replaced with a portion of a conductive support member 711 or a conductive bracket (not illustrated) including a plurality of slits 5611. In some embodiments, the conductive member 550 may be arranged on the opposite substrate surface 5902 of the substrate 590, and may be replaced with a conductive shield member 594 including a plurality of slits 5611.

Hereinafter, an arrangement relationship for the plurality of conductive slits 560 will be described in detail.

The antenna structure 500 and conductive member 550 can be pressed up against a side member 720 of the housing 710. The side member 720 can include a non-conductive portion 722 and conductive portion 721. The first substrate surface 5901 and the conductive patches 510-540 can make contact with an inner surface of the non-conductive portion 722. The conductive patches 510-540 can form a beam pattern through the non-conductive portion 722 of the side member 720. The conductive member 550 faces the opposite direction. The conductive member 550 may support the antenna structure 500 and face the inside of the electronic device. The plurality of first slits 560 may face the inside of the electronic device.

Although the antenna structure 500 is in the vicinity of the conductive portion 721, induced eddy currents are reduced. The plurality of first slits 560 may be formed to have a length in a direction perpendicular to a polarization direction in at least a portion of the conductive member 550. This causes the eddy currents that are induced in the conductive portion 721 to be close to in-phase, thereby reducing degradation in performance.

FIG. 7A is a view illustrating a configuration of a portion of an electronic device illustrating an arrangement structure of an antenna structure to which a conductive member according to certain embodiments of the disclosure is applied. FIG. 7B is a partial cross-sectional view of the electronic device according to certain embodiments of the disclosure taken along line 7*b*-7*b* in FIG. 7A.

The electronic device 700 of FIGS. 7A and 7B may be at least partially similar to the electronic device 101 of FIG. 1 or the electronic device 300 of FIGS. 3A to 3C, or may further include other embodiments of the electronic devices.

Referring to FIGS. 7A and 7B, the electronic device 700 may include a housing 710 (e.g., the housing 310 in FIG. 3A) including a front plate 730 (e.g., the front plate 302 of FIG. 3A) oriented in a first direction (e.g., the z-axis direction), a rear plate 740 (e.g., the rear plate 311 in FIG. 3B) oriented in a direction (e.g., −z-axis direction) opposite to the front plate 730, and a side member 720 (e.g., the side bezel structure 320 in FIG. 3A) surrounding the space 7001 between the front plate 730 and the rear plate 740. The side surface member 720 may include a first side surface 720*a* having a first length in a predetermined direction (e.g., the y-axis direction), a second side surface 720*b* extending from the first side surface 720*a* in a direction (e.g., the x-axis direction) substantially perpendicular to the first side surface 720*a* and having a second length shorter than the first length, a third side surface 720*c* extending from the second side surface 720*b* substantially parallel to the first side surface 720*a* and having the first length, and a fourth side surface 720*d* extending from the third side surface 720*c* to the first side surface 720*a* substantially parallel to the second side surface 720*b* and having the second length.

The side member 720 may include a conductive portion 721 that is at least partially arranged and a non-conductive portion 722 (e.g., a polymer portion) that is insert-injection-molded into the conductive portion 721. In some embodiments, the non-conductive portion 722 may be replaced with a space or another dielectric material. The non-conductive portion 722 may be structurally coupled to the conductive portion 721. The side member 720 may include a support member 711 (e.g., the first support member 3111 in FIG. 3C) extending from the side member 720 to at least a portion of the inner space 7001.

The support member 711 may extend from the side member 720 into the inner space 7001 or may be provided by structural coupling with the side member 720. According to an embodiment, the support member 711 may extend from the conductive portion 721. The support member 711 may support at least a portion of the antenna structure 500 arranged in the inner space 7001. The support member 711 may be arranged to support at least a portion of the display 750. The display 750 may be arranged to be visible from the outside through at least a portion of the front plate 730.

The antenna structure 500 may be arranged such that an array antenna (AR) including conductive patches (e.g., the conductive patches 510, 520, 530, and 540 in FIG. 5A) form a beam pattern substantially in a first direction (direction ①) in which the side member 720 is oriented. In this case, the beam pattern of the antenna structure 500 may be formed through the non-conductive portion 722 of the side member 720. In some embodiments, the antenna structure 500 may be replaced with a plurality of antenna structures having substantially the same structure. The plurality of antenna structures may be arranged such that a beam pattern is formed in a direction in which at least one of the first side surface 720*a*, the second side surface 720*b*, the third side surface 720*c*, and/or the fourth side surface 720*d* is oriented. The antenna structure 500 may be arranged such that the first substrate surface 5901 corresponds to the side member 720. The antenna structure 500 may be arranged to face the side member 720 through the conductive member 550 arranged on a module mounting portion 7201 provided via the side member 720 and/or the side portion 720 and at least a portion of the support member 711. The antenna structure 500 may be arranged substantially perpendicular to the front plate 730 such that the first substrate surface 5901 of the substrate 590 corresponds to the side member 720 and may be configured such that a beam pattern is formed in the first direction (direction ①), the space between the side member 720 and the front plate 730, the direction in which the front plate 730 is oriented, the space between the side member 720 and the rear plate 740, and/or the direction in which the rear plate 740 is oriented. The electronic device 700 may include a main substrate 760 arranged in the inner space 7001. Although not illustrated, the antenna structure 500 may be electrically connected to the main board 760 via an electrical connection member (e.g., an FPCB connector).

According to certain embodiments, the electronic device 700 may include a conductive member 550 arranged on the module mounting portion 7201, which supports at least a portion of the antenna structure 500 and is provided via the conductive portion 721 of the housing 710. For example, the conductive member 550 may support the substrate 590 such that at least a portion of the second substrate surface 5902 is supported by the first support portion 5511 and at least a portion of the first substrate side-surface (e.g., the first substrate side-surface 5903*a* in FIG. 6) is supported by the second support portion 5512. In addition, the conductive member 550 may be arranged such that at least a portion of the second substrate side-surface (e.g., the second substrate side-surface 5903*b* in FIG. 6) is supported by the third support portion (e.g., the third support portion 5513 in FIG. 6) of the conductive member 550 and at least a portion of the fourth substrate side-surface (e.g., the fourth substrate side-surface 5903*d* in FIG. 6) is supported by the fourth support portion (e.g., the fourth support portion 5514 in FIG. 6). The conductive member 550 may include a plurality of first conductive slits 560 formed in the first support portion 5511 to have a length in a predetermined direction.

According to an embodiment, respective unit conductive slits 5611 of the plurality of first conductive slits may be arranged at a predetermined interval. The plurality of first conductive slits 560 may be formed to have a length in a direction perpendicular to the polarization direction of the array antenna AR. In some embodiments, the plurality of first conductive slits 560 may be arranged to have a length in a direction perpendicular to a direction of specific polarized waves direction when the array antenna AR operates to form double polarization having a vertically polarized wave and a horizontally polarized wave. The specific polarized waves may include a vertically polarized wave. In some embodiments, the electronic device 700 may further include a heat-conducting member 570 arranged between the conductive member 550 and the conducive portion 721 of the side member 720. The heat conduction member 570 may include a thermal interface material (TIM), and effective heat diffusion may be induced when the heat transferred from the antenna structure 500 to the conductive member 550 is transferred to the conductive portion 721 of the side member 720 and/or the support member 711.

Figure 7C:
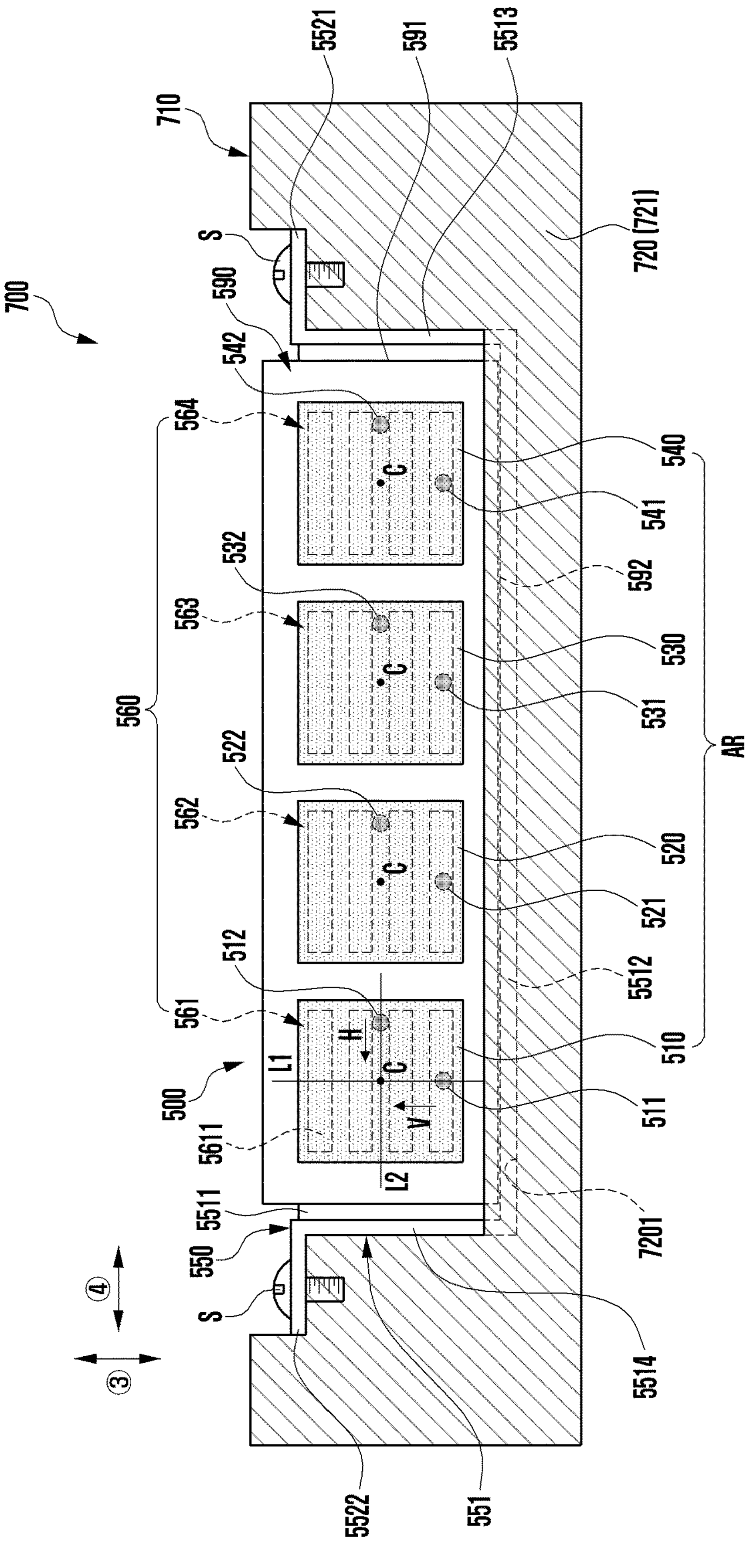
FIG. 7C is a partial cross-sectional view of the electronic device according to certain embodiments of the disclosure taken along line 7*c*-7*c* in FIG. 7A.

FIG. 7C is a partial cross-sectional view of the electronic device according to certain embodiments of the disclosure taken along line 7*c*-7*c* in FIG. 7A.

Referring to FIG. 7C, the electronic device 700 may include a housing 710 including a conductive portion 721 and an antenna structure 500 as an array antenna AR arranged in the inner space of the housing 710. The housing 710 may include a side member 720 that forms at least a portion of a side surface (e.g., the side surface 310C in FIG. 3A) of the electronic device 700, and may accommodate the antenna structure 500 that forms a beam pattern in a direction in which the side surface is oriented through at least a portion of the non-conductive portion (e.g., the non-conductive portion 722 in FIG. 7B) coupled to the conductive portion 721. The antenna structure 500 may be fixed in a manner of being arranged between the housing 710 and the conductive member 550 arranged in the housing 710. In this case, the conductive member 550 may be fixed to at least a portion of the side member 720 through fastening members such as screws S.

According to certain embodiments, the antenna structure 500 may include a substrate 590 and a first conductive patch 510, a second conductive patch 520, a third conductive patch 530, and a fourth conductive patch 540 as antenna elements, which are arranged on the substrate 590 at a predetermined interval. When the substrate 590 is arranged in the inner space of the housing 710, at least a portion of the substrate 590 (e.g., the cross section 591 and/or the edge portion of the long side 592 of the substrate 590) may be arranged to overlap the conductive portion 721 when the side member 720 is viewed from the outside. In some embodiments, all of the substrate 590 may be arranged not to overlap the conductive portion 721. That is, a remaining portion of the side member 720 that does not include the conductive portion 721 may fully overlap the substrate 590. When the substrate 590 is arranged in the inner space of the housing 710, the first conductive patch 510, the second conductive patch 520, the third conductive patch 530, and the fourth conductive patch 540 may be arranged at a position that does not overlap the conductive portion 721 when the side member 720 is viewed from the outside. In some embodiments, the first conductive patch 510, the second conductive patch 520, the third conductive patch 530, and the fourth conductive patch 540 may be arranged at a position that overlap the non-conductive portion 722 when the side member 720 is viewed from the outside. In some embodiments, the first conductive patch 510, the second conductive patch 520, the third conductive patch 530, and the fourth conductive patch 540 may be arranged at a position at which the fourth conductive patch 540 at least partially overlaps the conductive portion 721. In this case, the first to eighth feeding portions 511, 512, 521, 522, 531, 532, 541, and 542, which will be described later, may be arranged at a position that does not overlap the conductive portion 721.

According to certain embodiments, the antenna structure 500 may include a first feeding portion 511 arranged at a first point of the first conductive patch 510 and a second feeding portion 512 arranged at a second point spaced apart from the first feeding portion 511. The wireless communication circuit (e.g., the wireless communication circuit 595 in FIG. 5B) may be electrically connected to the first feeding portion 511 and the second feeding portion 512 via a wiring structure arranged inside the substrate 590. The first feeding portion 511 may be arranged on a first virtual line L1 passing through the center C of the first conductive patch 510. The second feeding portion 512 may be arranged on a second virtual line L2 passing through the center C of the first conductive patch 510 and vertically intersecting the first virtual line L1. The antenna structure 500 may include a third feeding portion 521 and a fourth feeding portion 522 arranged on the second conductive patch 520 in substantially the same manner as the arrangement structure of the first feeding portion 511 and the second feeding portion 512 arranged on the first conductive patch 510. The antenna structure 500 may include a fifth feeding portion 531 and a sixth feeding portion 532 arranged on the third conductive patch 530 in substantially the same manner as the arrangement structure of the first feeding portion 511 and the second feeding portion 512 arranged on the first conductive patch 510. The antenna structure 500 may include a seventh feeding portion 541 and an eighth feeding portion 542 arranged on the fourth conductive patch 540 in substantially the same manner as the arrangement structure of the first feeding portion 511 and the second feeding portion 512 arranged on the first conductive patch 510. Accordingly, the antenna structure 500 may be operated as an array antenna AR via the first conductive patch 510, the second conductive patch 520, the third conductive patch 530, and the fourth conductive patch 540. For example, the wireless communication circuit (e.g., the wireless communication circuit 595 in FIG. 5B) may be configured such that a first polarized wave operating in a third direction (direction ③) parallel to the short sides 591 of the substrate is formed via the first feeding portion 511, the third feeding portion 521, the fifth feeding 531, and the seventh feeding portion 541, and may be configured such that a second polarized wave perpendicular to the first polarized wave is formed in a fourth direction (direction ④) parallel to the long sides 592 of the substrate via the second feeding portion 512, the fourth feeding portion 522, the sixth feeding portion 532, and the eighth feeding portion 542. The wireless communication circuit (e.g., the wireless communication circuit 595 in FIG. 5B) may be configured to transmit and/or receive a wireless signal in a frequency band in the range from about 3 GHz to about 300 GHz via the array antenna AR.

According to certain embodiments, the conductive member 550 may include a plurality of first conductive slits 560 arranged on a first support portion 5511 corresponding to the second substrate surface 5902. The plurality of first conductive slits 560 may include, in the first support portion 5511, first sub-slits 561 (e.g., a first pattern) arranged at a position at which the first sub-slits 561 at least partially overlap the first conductive patch 510 when the first substrate surface 5901 is viewed from above (when the side member 720 is viewed from the outside), second sub-slits 562 (e.g., a second pattern) arranged at a position at which the second sub-slits 562 at least partially overlap the second conductive patch 520 when the first substrate surface 5901 is viewed from above, third sub-slits 563 (e.g., a third pattern) arranged at a position which the third sub-slits 563 at least partially overlap the third conductive patch 530 when the first substrate surface 5901 is viewed from above, and fourth sub-slits 564 (e.g., a fourth pattern) arranged at a position at which the fourth sub-slits 564 at least partially overlap the fourth conductive patch 540 when the first substrate surface 5901 is viewed from above. The plurality of first conductive slits 560 may be formed to have a length in a direction (e.g., direction ④) perpendicular to the vertical polarization direction (e.g., direction ③) of the above-described two polarized waves.

The antenna structure 500 according to an exemplary embodiment of the disclosure may be helpful for suppressing radiation performance degradation of the array antenna AR by reducing eddy current generated by the a peripheral conductive portion 721 of the housing 710 by inducing the eddy current to be close to in-phase via the plurality of conductive slits 560 formed to have a length in a direction perpendicular to a polarization direction (e.g., a vertical polarization direction) in at least a partial region of the conductive member 550 supporting the substrate 590.

Figure 8A:
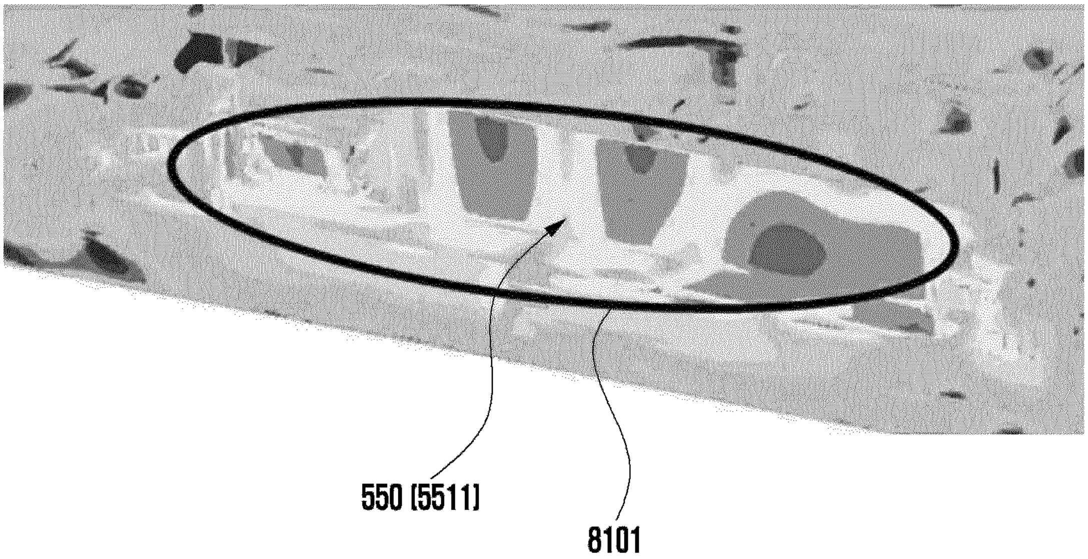
FIGS. 8A and 8B are views illustrating, in a comparative manner, a current distribution excited in a conductive member when a plurality of slits according to certain embodiments of the disclosure are present and a current distribution when the plurality of slits are absent, respectively.
Figure 8B:
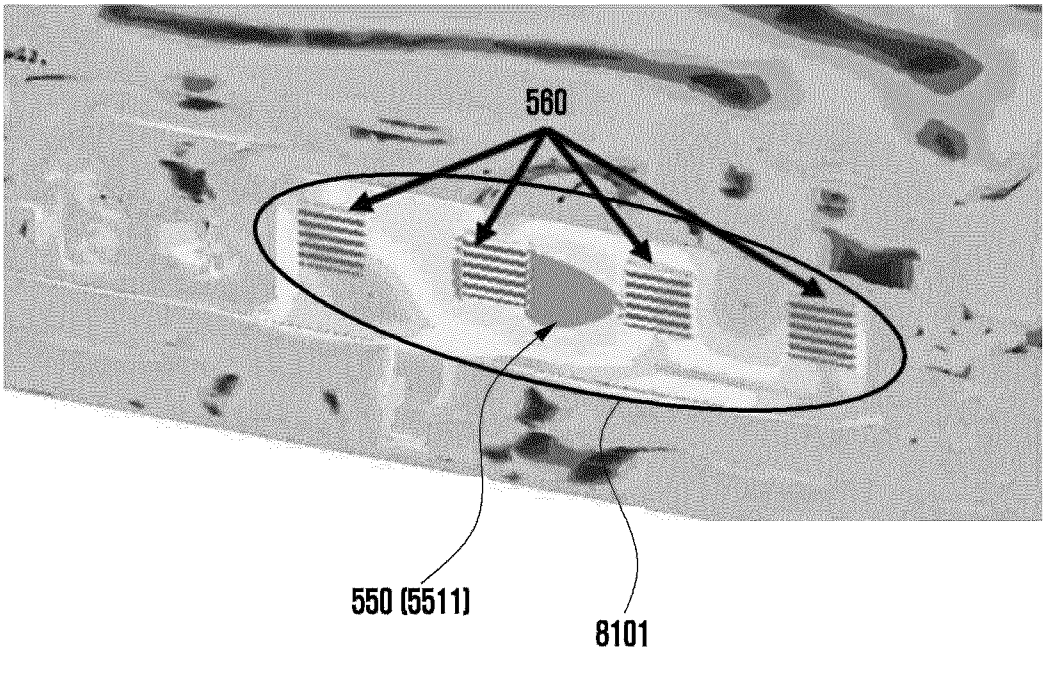

FIGS. 8A and 8B are views illustrating, in a comparative manner, a current distribution excited in a conductive member when a plurality of slits according to certain embodiments of the disclosure are present and a current distribution when the plurality of slits are absent, respectively.

FIG. 8A is a view illustrating an eddy current distribution around an antenna structure 500 supported via a conductive member 550 in which the plurality of first conductive slits 560 are not formed, and FIG. 8B a view illustrating an eddy current distribution around the antenna structure 500 supported via the conductive member 550 in which the plurality of first conductive slits 560 are formed according to an exemplary embodiment.

Referring to FIGS. 8A and 8B, it can be seen that, when the antenna structure 500 operates in a predetermined frequency band (e.g., n261 band (27.5 GHz to 28.35 GHz)), the eddy current is reduced in the region of the portion 8101 in which the plurality of conductive slits 560 are formed. This means that the conductive portion 721 may be helpful for reducing the radiation performance degradation of the antenna structure 500 since the eddy current formed around the antenna structure 500 is reduced via the first plurality of conductive slits 560.

According to certain embodiments, as illustrated in Table 1 below, in a 50% section of a cumulative distribution function (CDF), it can be seen that a gain of 4.7 dB is exhibited in the case of FIG. 8A, whereas a gain of 5 dB is exhibited in the case of FIG. 8B, whereby the gain is substantially improved by 0.3 dB.

TABLE 1

| | Frequency n261 | |
|---|---|---|
| Gain CDF | Peak | CDF 50% |
| FIG. 8A | 8.9 | 4.7 |
| FIG. 8B | 9.0 | 5 |

Figure 9A:
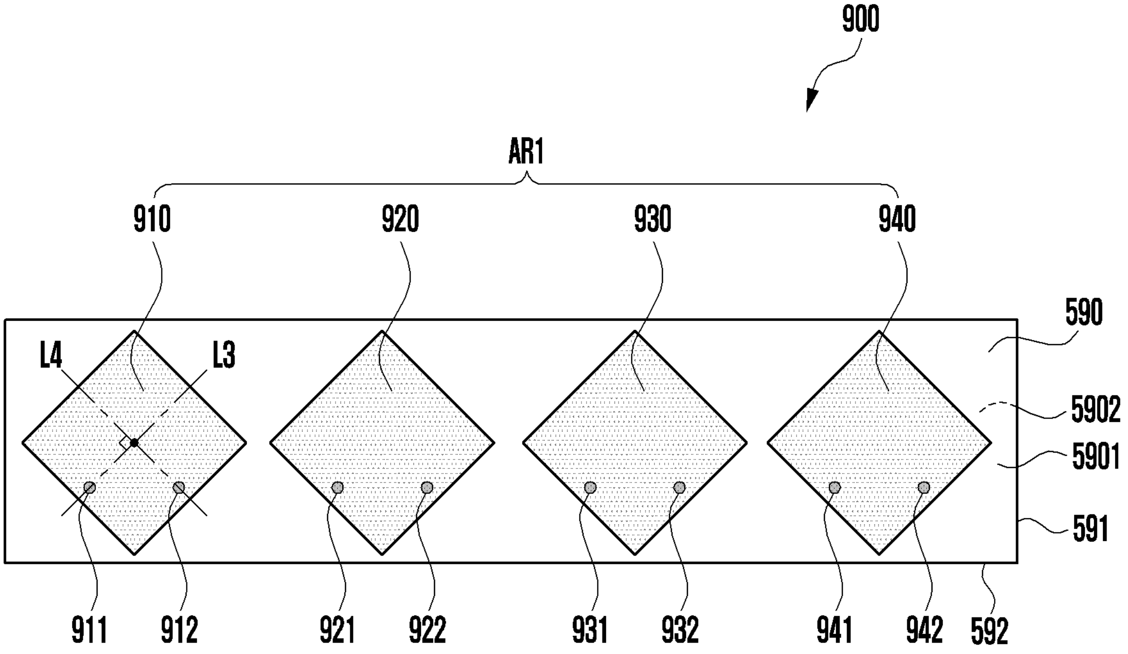
FIG. 9A is a view illustrating a configuration of an antenna structure according to certain embodiments of the disclosure.
Figure 9B:
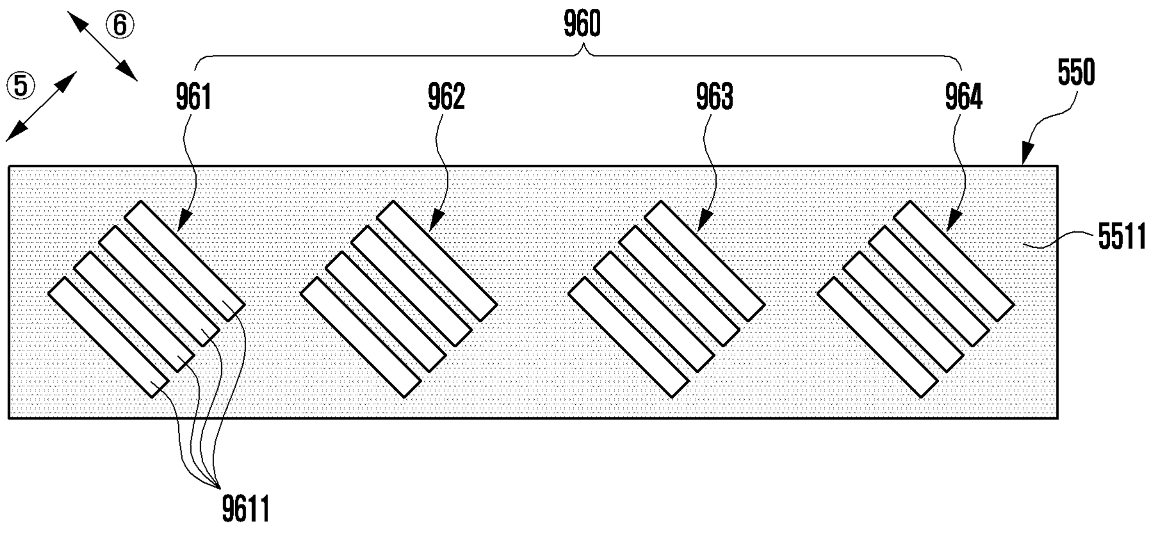
FIG. 9B is a view illustrating a partial configuration of a conductive member supporting the antenna structure of FIG. 9A according to certain embodiments of the disclosure.

FIGS. 9A and 9B shows a configuration of the conductive patches 910, 920, 930, 940 that are rotated 45 degrees as compared to the configuration in FIG. 5A. Similarly, the plurality of first conductive slits are also rotated 45 degrees. Additionally, the feeding portions of are along lines L3 and L4.

FIG. 9A is a view illustrating a configuration of an antenna structure according to certain embodiments of the disclosure. FIG. 9B is a view illustrating a partial configuration of a conductive member supporting the antenna structure of FIG. 9A according to certain embodiments of the disclosure.

The antenna structure 900 of FIG. 9A may be at least partially similar to the third antenna module 246 of FIG. 2, or may further include other embodiments of the antenna structure. In some embodiments, the antenna structure 500 arranged in the electronic device 700 of FIG. 7C may be replaced with the antenna structure 900 of FIG. 9A.

Referring to FIGS. 9A and 9B, the antenna structure 900 may include a substrate 590 and a plurality of conductive patches 910, 920, 930, and 940, as an array antenna AR1, arranged on the substrate 590 to be spaced apart from each other at a predetermined interval. The plurality of conductive patches 910, 920, 930, and 940 may include a first conductive patch 910, a second conductive patch 920, a third conductive patch 930, and a fourth conductive patch 940, which are arranged to form a beam pattern in a direction in which the first substrate surface 5901 is oriented. The first conductive patch 910, the second conductive patch 920, the third conductive patch 930, and the fourth conductive patch 940 may be formed in a rhombus shape defined by sides that are not parallel to the short sides 591 and the long sides 591 of the substrate 590.

According to certain embodiments, the antenna structure 900 may include a first feeding portion 911 arranged at a first point of the first conductive patch 910 and a second feeding portion 912 arranged at a second point spaced apart from the first feeding portion 911. The wireless communication circuit (e.g., the wireless communication circuit 595 in FIG. 5B) may be electrically connected to the first feeding portion 911 and the second feeding portion 912 via a wiring structure arranged inside the substrate 590. The first feeding portion 911 may be arranged on a first virtual line L3 passing through the center C of the first conductive patch 910. The second feeding portion 912 may be arranged on a second virtual line L4 passing through the center C of the first conductive patch 910 and vertically intersecting the first virtual line L3. The feeding portions 911 and 912 may be arranged on the first imaginary line L3 and the second virtual line L4 which are defined not parallel to the short sides 591 and the long sides 592 of the substrate in the first conductive patch 910. The antenna structure 900 may include a third feeding portion 921 and a fourth feeding portion 922 arranged on the second conductive patch 920 in substantially the same manner as the arrangement structure of the first feeding portion 911 and the second feeding portion 912 arranged on the first conductive patch 910. The antenna structure 900 may include a fifth feeding portion 931 and a sixth feeding portion 932 arranged on the third conductive patch 930 in substantially the same manner as the arrangement structure of the first feeding portion 911 and the second feeding portion 912 arranged on the first conductive patch 910. The antenna structure 900 may include a seventh feeding portion 941 and an eighth feeding portion 942 arranged on the fourth conductive patch 940 in substantially the same manner as the arrangement structure of the first feeding portion 911 and the second feeding portion 912 arranged on the first conductive patch 910. Accordingly, the antenna structure 900 may be operated as an array antenna AR1 via the first conductive patch 910, the second conductive patch 920, the third conductive patch 930, and the fourth conductive patch 940. For example, the wireless communication circuit (e.g., the wireless communication circuit 595 in FIG. 5B) may be configured such that a first polarized wave operating in a fifth direction (direction ⑤) is formed via the first feeding portion 911, the third feeding portion 921, the fifth feeding 931, and the seventh feeding portion 941, and may be configured such that a second polarized wave is formed in a sixth direction (direction ⑥) perpendicular to the first polarized wave via the second feeding portion 912, the fourth feeding portion 922, the sixth feeding portion 932, and the eighth feeding portion 942. The wireless communication circuit (e.g., the wireless communication circuit 595 in FIG. 5B) may be configured to transmit and/or receive a wireless signal in a frequency band in the range from about 3 GHz to about 300 GHz via the array antenna AR1.

According to certain embodiments, the conductive member 550 may include a plurality of first conductive slits 960 arranged on a first support portion 5511 corresponding to the second substrate surface 5902. The plurality of first conductive slits 560 may include first sub-slits 961 (e.g., a first pattern) arranged at a position at which the first sub-slits 961 at least partially overlap the first conductive patch 910 when the first substrate surface 5901 is viewed from above (when the side member 720 is viewed from the outside), second sub-slits 962 (e.g., a second pattern) arranged at a position at which the second sub-slits 962 at least partially overlap the second conductive patch 920 when the first substrate surface 5901 is viewed from above, third sub-slits 963 (e.g., a third pattern) arranged at a position at which the third sub-slits 963 at least partially overlap the third conductive patch 930 when the first substrate surface 5901 is viewed from above, and fourth sub-slits 964 (e.g., a fourth pattern) arranged at a position at which the fourth sub-slits 964 at least partially overlap the fourth conductive patch 940 when the first substrate surface 5901 is viewed from above. The plurality of first conductive slits 960 may be arranged to have a length in a direction (e.g., direction ⑥) perpendicular to the vertical polarization direction (e.g., direction ⑤) of the above-described two polarized waves (e.g., a direction inclined at an angle of 45 degrees with respect to the long sides of the substrate 590).

The antenna structure 900 according to an exemplary embodiment of the disclosure may be helpful for suppressing radiation performance degradation of the array antenna AR1 by reducing eddy current generated by the a peripheral conductive portion 721 of the housing 710 by inducing the eddy current to be close to in-phase via the plurality of conductive slits 960 formed to have a length in a direction perpendicular to a polarization direction (e.g., a vertical polarization direction) in at least a partial region of the conductive member 550 supporting the substrate 590.

In certain embodiments, the conductive member can have a plurality of second conductive slits 560-1, a plurality of third conductive slits 560-2, and a plurality of fourth conductive slits 560-3.

Figure 10:
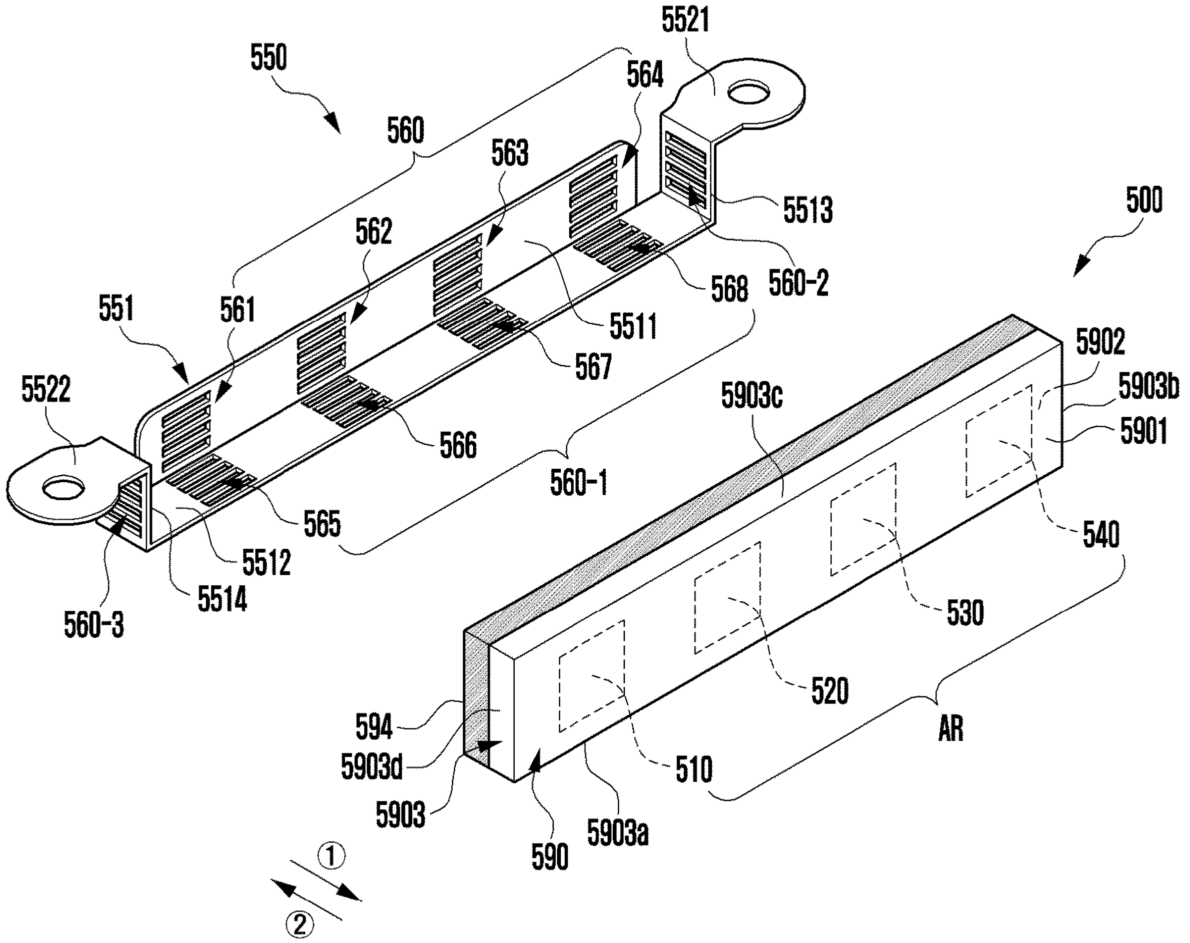
FIG. 10 is an exploded perspective view illustrating a state in which a conductive member is applied to an antenna structure according to certain embodiments of the disclosure.

FIG. 10 is an exploded perspective view illustrating a state in which a conductive member is applied to an antenna structure according to certain embodiments of the disclosure.

In describing the antenna structure 500 and the conductive member 550 of FIG. 10, the same reference numerals are assigned to the components substantially the same as those of the antenna structure 500 and the conductive member 550 of FIG. 6, and a detailed description thereof may be omitted.

Referring to FIG. 10, the conductive member 550 may further include a plurality of second conductive slits 560-1 arranged in the second support portion 5512, a plurality of third conductive slits 560-2 arranged in the third support portion 5513, and a plurality of fourth conductive slits 560-3 arranged in the fourth support portion 5514. In this case, the plurality of second conductive slits 560-1 may include, in the second support portion 5512, fifth sub-slits 565 (e.g., a fifth pattern) arranged at a position corresponding to the first sub-slits 561, sixth sub-slits 566 (e.g., a sixth pattern) arranged at a position corresponding to the second sub-slits 562, seventh sub-slits 567 (e.g., a seventh pattern) arranged at a position corresponding to the third sub-slits 563, and eighth sub-slits 568 arranged at a position corresponding to the fourth sub-slits 564. The fifth to eighth sub-slits 565, 566, 567, and 568 are also formed to have lengths in the same direction as the first to fourth sub-slits 561, 562, 563, and 564. The plurality of third conductive slits 560-2 and the plurality of fourth conductive slits 560-3 are also formed in the second support portion 5513 and the fourth support portion 5514 to have a length in a direction perpendicular to the vertical polarization direction (e.g., direction ③ in FIG. 7C).

FIGS. 11A to 11J are views illustrating various shapes and arrangement structures of a plurality of slits according to certain embodiments of the disclosure for comparison.

In the description made with reference to FIGS. 11A to 11J, the "vertical direction" may mean a "V direction" that is a vertical polarization direction through the first feeding portion 511 of the conductive patch 510, and the "horizontal direction" may mean an "H direction" that is a horizontal polarization direction through the second feeding portion 512 of the conductive patch 510. In addition, in order to describe the arrangement relationship between at least one slit 5611 arranged in the conductive member 550 and at least one conductive patch 510, only the at least one conductive patch 510 is illustrated with a dotted line, but it is apparent that at least one conductive patch 510 is arranged on a substrate (e.g., the substrate 590 in FIG. 6), as described above.

Figure 11A:
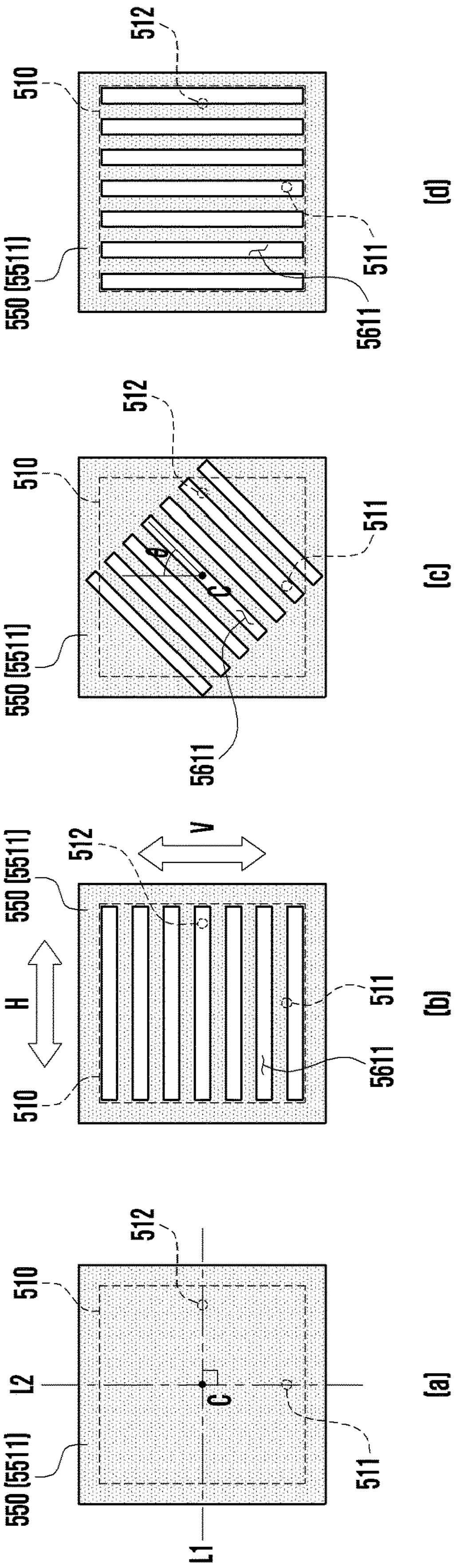
FIGS. 11A to 11J are views illustrating configurations of portions of conductive members, respectively, in which various shapes and arrangement structures of a plurality of slits according to certain embodiments of the disclosure are illustrated.

FIG. 11A compares the performance of an antenna structure (e.g., the antenna structure 500 of FIG. 6) may include a conductive patch 510 arranged on a substrate (e.g., the substrate 590 in FIG. 6). The antenna structure 500 may include a first feeding portion 511 arranged on a first virtual line L1 that passes through the center C of the conductive patch 510 and a second feeding portion 512 arranged on a second virtual line L2 that passes through the center C of the conductive patch 510 and is orthogonal to the first virtual line L1. According to an embodiment, a wireless communication circuit (e.g., the wireless communication circuit 595 in FIG. 5B) may be configured to form a vertically polarized wave via the first feeding portion 511 and to form a horizontally polarized wave orthogonal to the vertically polarized wave via the second feeding portion 512. The substrate (e.g., the substrate 590 in FIG. 6) including the conductive patch 510 may be arranged to be at least partially supported by the conductive member 550. The conductive member 550 may include at least one conductive slit 5611 arranged to at least partially overlap the conductive patch 510 when the conductive patch 510 is viewed from above.

According to certain embodiments, (a) in FIG. 11A illustrates an arrangement relationship between the conductive member 550 and the conductive patch 510 in which no conductive slit is present, (b) in FIG. 11A illustrates an arrangement relationship between the conductive member 550 including a plurality of conductive slits 5611 having a length in a direction (H direction) perpendicular to the vertical direction (V direction) and the conductive patch 510, (c) in FIG. 11A illustrates an arrangement relationship between the conductive member 550 including a plurality of conductive slits 5611 having a length in an oblique direction of 45 degrees with respect to the vertical direction (V direction) and the conductive patch 510, and (d) in FIG. 11A illustrates an arrangement relationship between the conductive member 550 including a plurality of conductive slits 5611 having a length in the same direction as the vertical direction (V direction) and the conductive patch 510.

As illustrated in Table 2 below, it can be seen that, when the antenna structure 500 including the conductive patch 510 is operated in a predetermined frequency band (e.g., a band of about 28 GHz), in CDF 50% section, a gain of 2.4 dB is exhibited in (a) in FIG. 11A while a gain of 2.7 dB is exhibited in (b) in FIG. 11A, a gain of 2.6 dB is exhibited in (c) in FIG. 11A, and a gain of 2.3 dB is exhibited in (d) in FIG. 11A. It can be seen that, for example, when the plurality of conductive slits 5611 formed in the conductive member 550 are formed to have a length in a direction (H direction) perpendicular to the direction in which a vertically polarized wave is formed (V direction), the most best gain improvement can be exhibited, and that the gain improvement effect becomes insignificant as a change is made to have a length in a direction matching the direction in which a vertically polarized wave is formed (V direction). In this case, it may mean that in the case of an antenna structure 500 having double polarization, when the plurality of conductive silts 5611 formed in the conductive member 550 are formed to have a length closer to a direction perpendicular to a vertically polarized wave (H direction), it may be helpful for obtaining a greater gain improvement effect and for improving the radiation performance of the antenna structure 500.

TABLE 2

| | Frequency (GHz) 28 GHz | |
|---|---|---|
| Gain CDF | CDF 50% | Peak |
| No slit ((a) in FIG. 11A) | 2.4 | 8.8 |
| Horizontal slits ((b) in FIG. 11A) | 2.7 | 8.8 |
| 45-degree slits ((c) in FIG. 11A) | 2.6 | 8.7 |
| Vertical slits ((d) in FIG. 11A) | 2.3 | 8.7 |

In making a description with reference to FIGS. 11B to 11J, the same reference numerals are assigned to components substantially the same as those of FIG. 11A, and a detailed description thereof may be omitted.

Figure 11B:
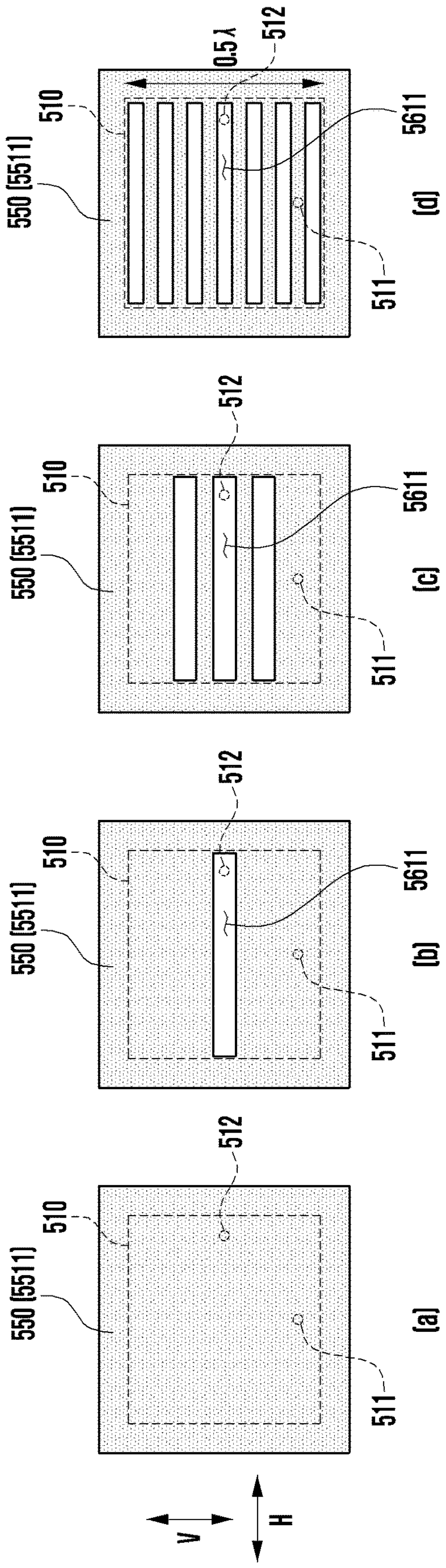
Figure 11C:
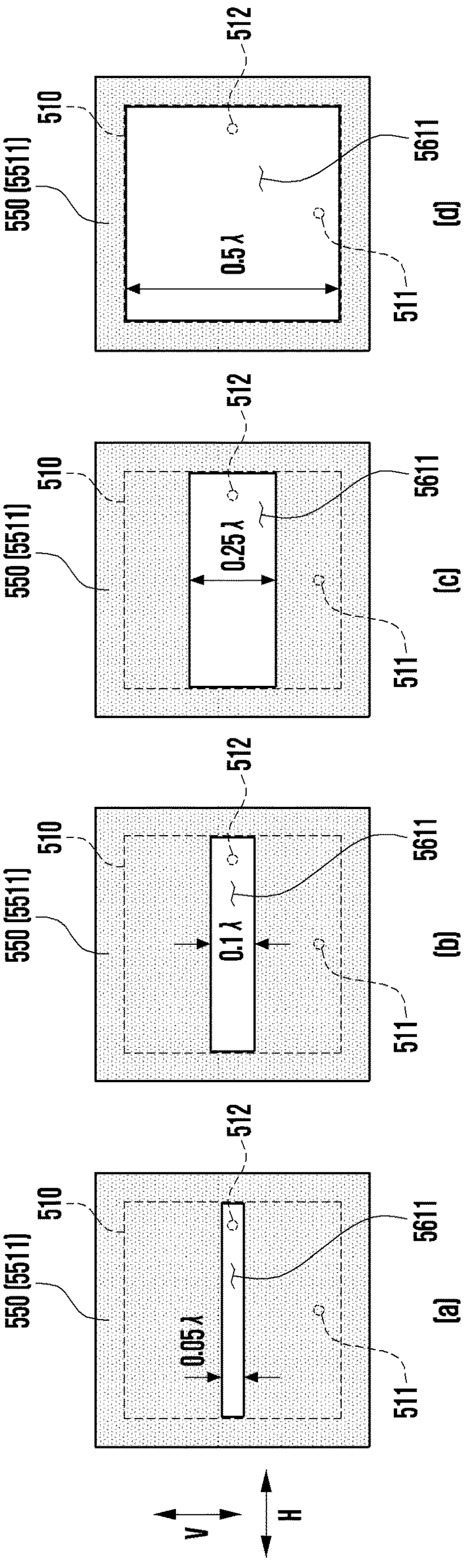

Referring to FIG. 11B, the performance is compared when the conductive member 550 may include conductive slits 5611 all of which are arranged in the horizontal direction (H direction) in a region overlapping the conductive patch 510. According to an embodiment, (a) in FIG. 11B illustrates an arrangement relationship of the conductive member 550 in which no conductive slit is present and the conductive patch 510, (b) in FIG. 11B illustrates a state in which one conductive slit 5611 is arranged in the substantially central portion of the region overlapping the conductive patch 510, (c) in FIG. 11C illustrates a state in which three conductive slits 5611 are arranged at a predetermined interval in the substantially the central portion of a region overlapping the conductive patch 510, and (d) in FIG. 11B illustrates a state in which a plurality of conductive slits 5611 are arranged at a predetermined interval using the entire region overlapping the conductive patch 510.

As illustrated in Table 3 below, it can be seen that, when the antenna structure 500 including the conductive patch 510 is operated in a predetermined frequency band (e.g., an about 28 GHz band), in CDF 50% section, a gain of 2.4 dB is exhibited in (a) in FIG. 11B while a gain of 2.5 dB is exhibited in (b) in FIG. 11B, a gain of 2.6 dB is exhibited in (c) in FIG. 11B, and a gain of 2.7 dB is exhibited in (d) in FIG. 11B. This may mean that, when a plurality of conductive slits 5611 are formed in the conductive member 550 and are arranged over the entire region overlapping the conductive patch 510, it may be helpful for obtaining a greater gain improvement effect and for improving the radiation performance of the antenna structure 500.

TABLE 3

| | Frequency (GHz) 28 GHz | |
|---|---|---|
| Gain CDF | CDF 50% | Peak |
| No slit ((a) in FIG. 11B) | 2.4 | 8.8 |
| 1 slit ((b) in FIG. 11B) | 2.5 | 8.7 |
| 3 slits ((c) in FIG. 11B) | 2.6 | 8.7 |
| 7 slits ((d) in FIG. 11B) | 2.7 | 8.8 |

Referring to FIG. 11C, the per performance is compared where the conductive member 550 may include conductive slits 5611 all of which are arranged in the horizontal direction (H direction) in a region overlapping the conductive patch 510. According to an embodiment, (a) in FIG. 11C illustrates a state in which a conductive slit 5611 having a first width (e.g., 0.05λ) is arranged in a substantially central portion of a region overlapping the conductive patch 510, (b) in FIG. 11C illustrates a state in which a conductive slit 5611 having a second width (e.g., 0.1λ) greater than the first width is arranged in a substantially central portion of a region overlapping the conductive patch 510, (c) in FIG. 11C illustrates a state in which a conductive slit 5611 having a third width (e.g., 0.25λ) greater than the second width is arranged in a substantially central portion of a region overlapping the conductive patch 510, and (d) in FIG. 11C illustrates a state in which a conductive slit 5611 having a fourth width (e.g., 0.5λ) greater than the third width is arranged in a substantially central portion of a region overlapping the conductive patch 510.

As illustrated in Table 4 below, it can be seen that, when the antenna structure 500 including the conductive patch 510 is operated in a predetermined frequency band (e.g., a band of about 28 GHz), in CDF 50% section, a gain of 2.4 dB is exhibited in (a) in FIG. 11C while a gain of 2.5 dB is exhibited in (b) in FIG. 11C, a gain of 2.6 dB is exhibited in (c) in FIG. 11C, and a gain of 2.5 dB is exhibited in (d) in FIG. 11C. For example, it can be seen that, when the conductive slit 5611 formed in the conductive member 550 is extended beyond a predetermined width (e.g., 0.25λ), a gain improvement effect is rather reduced. This may mean that, when the width of the conductive slit 5611 arranged in the conductive member 550 is appropriately determined, it may be helpful for improving the radiation performance of the antenna structure 500.

TABLE 4

| Gain CDF | Frequency (GHz) 28 GHz CDF 50% | Peak |
|---|---|---|
| No slit | 2.4 | 8.8 |
| 0.05λ ((a) in FIG. 11C) | 2.5 | 8.7 |
| 0.1λ ((b) in FIG. 11C) | 2.6 | 8.7 |
| 0.25λ ((c) in FIG. 11C) | 2.6 | 8.7 |
| 0.5λ ((d) in FIG. 11C) | 2.5 | 8.7 |

Figure 11D:
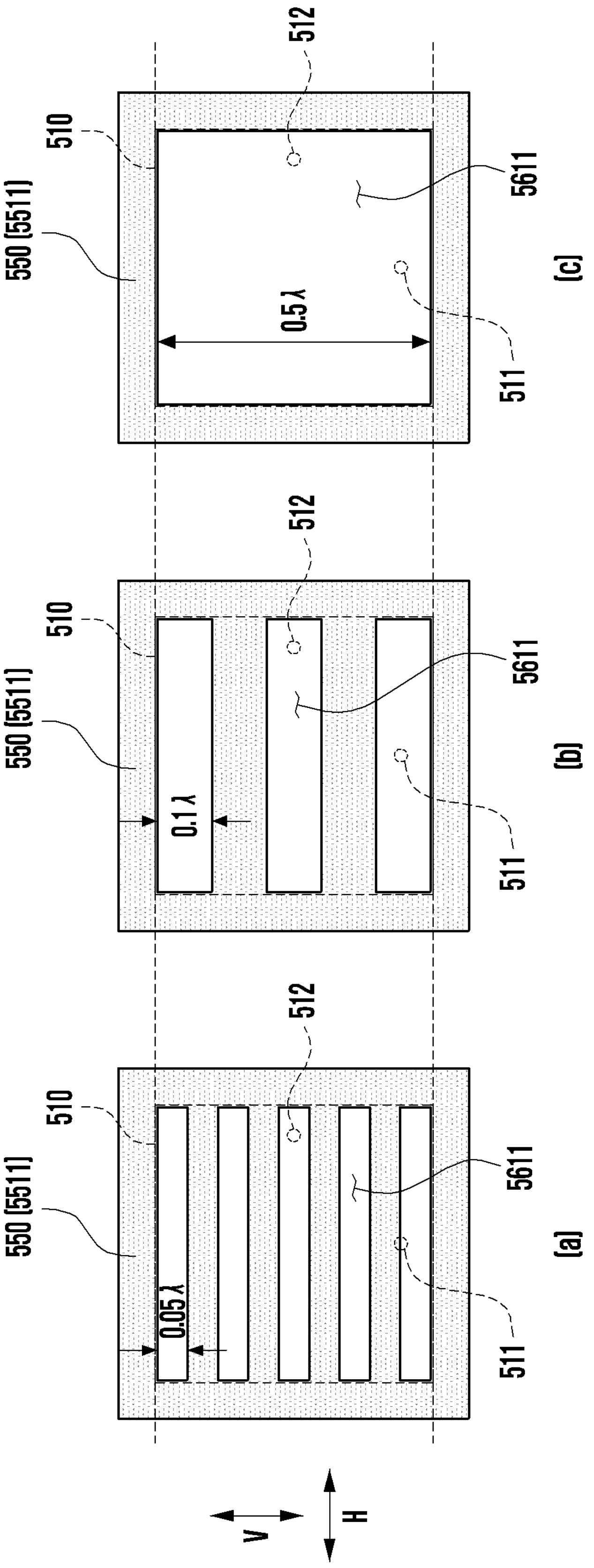

Referring to FIG. 11D, the performance is compared where the conductive member 550 may include conductive slits 5611 all of which are arranged in the horizontal direction (H direction) in a region overlapping the conductive patch 510. According to an embodiment, (a) in FIG. 11D illustrates a state in which a plurality of conductive slits 5611 having a first width (e.g., 0.05λ) are arranged over the entire region overlapping the conductive patch 510, (b) in FIG. 11D illustrates a state in which a plurality of conductive slits 5611 having a second width (e.g., 0.1λ) greater than the first width are arranged over the entire region overlapping the conductive patch 510, and (c) in FIG. 11D illustrates a state in which one conductive slit 5611 having a third width (e.g., 0.5λ) greater than the second width is arranged over the entire region overlapping the conductive patch 510.

As illustrated in Table 5 below, it can be seen that, when the antenna structure 500 including the conductive patch 510 is operated in a predetermined frequency band (e.g., a band of about 28 GHz), in CDF 50% section, a gain of 2.7 dB is exhibited in (a) in FIG. 11D while a gain of 2.6 dB is exhibited in (b) in FIG. 11D, and a gain of 2.5 dB is exhibited in (c) in FIG. 11D. For example, it can be seen that, when the width of the conductive slits 5611 formed in the conductive member 550 is small and the number of conductive slits 5611 is relatively great, the gain improvement effect is increased. This may mean that, when the width of the conductive slits 5611 arranged in the conductive member 550 is appropriately determined and a large number of slits are arranged at a predetermined interval, it may be helpful for improving the radiation performance of the antenna structure 500.

TABLE 5

| Gain CDF | Frequency (GHz) 28 GHz CDF 50% | Peak |
|---|---|---|
| No slit | 2.4 | 8.8 |
| 0.05λ × 5 ((a) in FIG. 11D) | 2.7 | 8.8 |
| 0.1λ × 3 ((b) in FIG. 11D) | 2.6 | 8.7 |
| 0.5λ × 1 ((c) in FIG. 11D) | 2.5 | 8.7 |

Figure 11E:
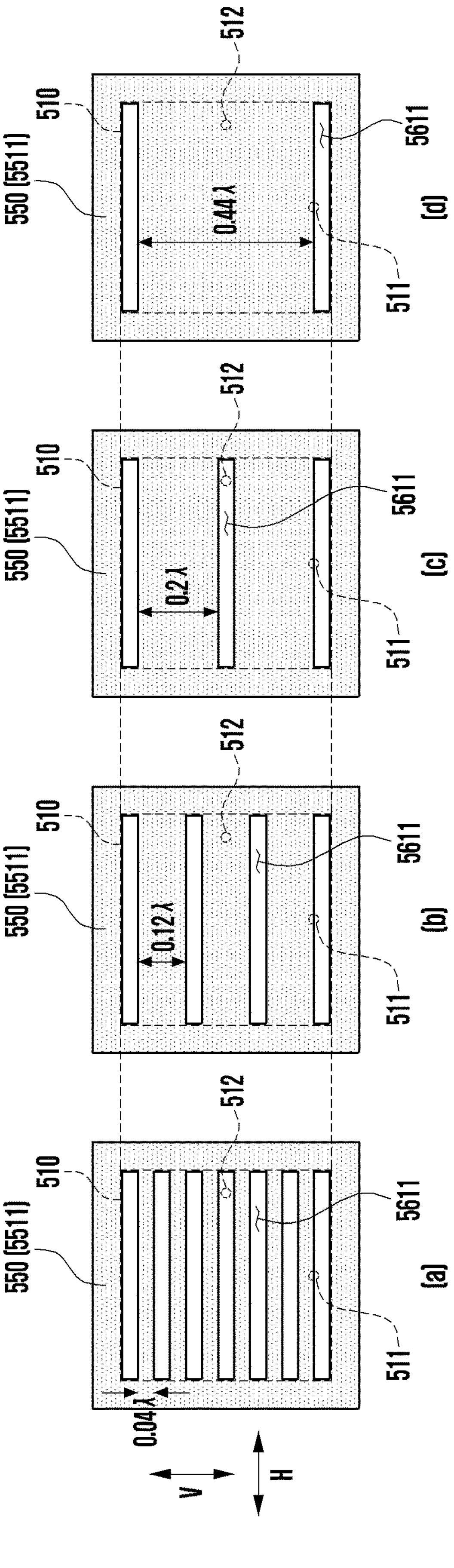

Referring to FIG. 11E, the performance is compared where the conductive member 550 may include conductive slits 5611 arranged in the horizontal direction (H direction) in a region overlapping the conductive patch 510. According to an embodiment, (a) in FIG. 11E illustrates a state in which a plurality of conductive slits 5611 having a first interval (e.g., 0.04λ) are arranged over the entire region overlapping the conductive patch 510, (b) in FIG. 11E illustrates a state in which a plurality of conductive slits 5611 having a second interval (e.g., 0.12λ) greater than the first interval are arranged over the entire region overlapping the conductive patch 510, (c) in FIG. 11E illustrates a state in which a plurality of conductive slits 5611 having a third interval (e.g., 0.2λ) greater than the second interval are arranged over the entire region overlapping the conductive patch 510, and (d) in FIG. 11E illustrates a state in which a plurality of conductive slits 5611 having a fourth interval (e.g., 0.44λ) greater than the third interval are arranged over the entire region overlapping the conductive patch 510.

As illustrated in Table 6 below, it can be seen that, when the antenna structure 500 including the conductive patch 510 is operated in a predetermined frequency band (e.g., an about 28 GHz band), in CDF 50% section, a gain of 2.7 dB is exhibited in (a) in FIG. 11E, a gain of 2.6 dB is exhibited in (b) in FIG. 11E, a gain of 2.6 dB is exhibited in (c) in FIG. 11E, and a gain of 2.5 dB is exhibited in (d) in FIG. 11E. For example, it can be seen that, when the interval between the conductive slits 5611 formed in the conductive member 550 is small and the number of conductive slits 5611 is relatively great, the gain improvement effect is increased compared to the case in which no conductive slit is present. This may mean that, when the interval of the conductive slits 5611 arranged in the conductive member 550 is appropriately determined and a large number of slits are arranged at a predetermined interval, it may be helpful for improving the radiation performance of the antenna structure 500.

TABLE 6

| Gain CDF | Frequency (GHz) 28 GHz CDF 50% | Peak |
|---|---|---|
| No slit | 2.4 | 8.8 |
| Gap 0.04λ ((a) in FIG. 11E) | 2.7 | 8.8 |
| Gap 0.12λ ((b) in FIG. 11E) | 2.6 | 8.7 |
| Gap 0.2λ ((c) in FIG. 11E) | 2.6 | 8.7 |
| Gap 0.44λ ((d) in FIG. 11E) | 2.5 | 8.7 |

Figure 11F:
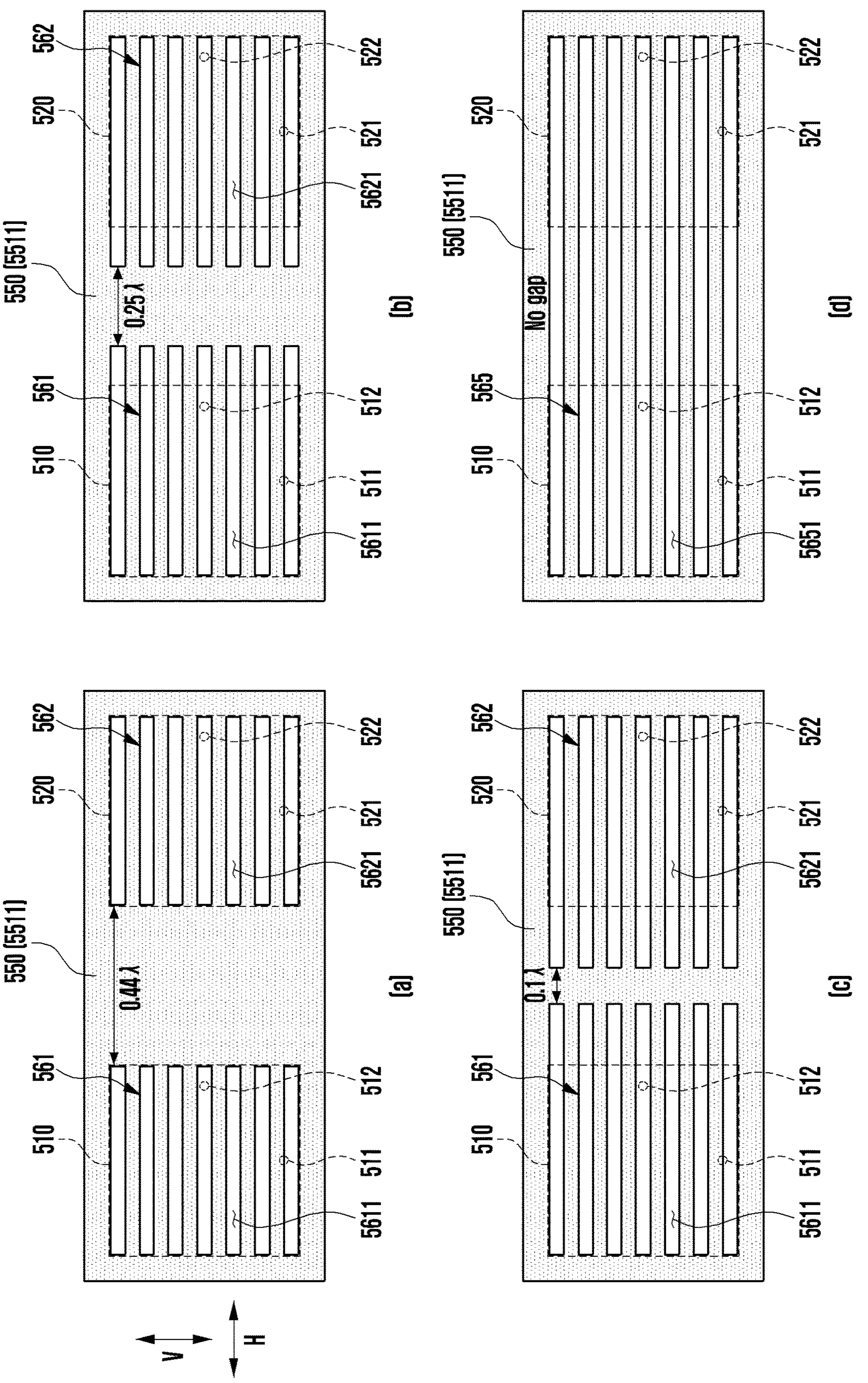

Referring to FIG. 11F, the performance is compared where the conductive member 550 may include a plurality of conductive slits 561 and 562 all of which are arranged in the horizontal direction (H direction) at a predetermined interval in a region overlapping a conductive patch 510. The plurality of conductive slits 561 and 562 may include first sub-slits 5612 (e.g., a first pattern) arranged at a position at which the first sub-slits 5612 at least partially overlap a first conductive patch 510 and second sub-slits 562 (e.g., a second pattern) arranged at a position at which the second sub-slits 562 at least partially overlap a second conductive patch 520. The first conductive patch 510 may include a first feeding portion 511 and a second feeding portion 512 spaced apart from the first feeding portion 511. The second conductive patch 520 may include a third feeding portion 521 and a fourth feeding portion 522 spaced apart from the second feeding portion 521. According to an embodiment, a wireless communication circuit (e.g., the wireless communication circuit 595 in FIG. 5B) may be configured to form a vertically polarized wave in the vertical direction (V direction) via the first feeding portion 511 and the third feeding portion 521, and may be configured to form a horizontally polarized wave in a direction perpendicular to the vertically polarized wave (H direction) via the second feeding portion 512 and the fourth feeding portion 522. According to an embodiment, (a) in FIG. 11F illustrates an arrangement state of first sub-slits 561 having an overlapping region matching the first conductive patch 510 and second slits 562 having an overlapping region matching the second conductive patch 520, wherein the first sub-slits and the second sub-slits have a first interval (e.g., 0.44λ) therebetween, (b) in FIG. 11F illustrates an arrangement state of first sub-slits 561 having a length in the horizontal direction (H direction) longer than the first conductive patch 510 and second sub-slits 562 having a length in the horizontal direction (H direction) longer than the second conductive patch 520, wherein the first sub-slits and the second sub-slits have a second interval (e.g., 0.25λ) smaller than the first interval therebetween, (c) in FIG. 11F illustrates an arrangement state of first sub-slits 561 having a length in the horizontal direction (H direction) longer than the first conductive patch 510 and second sub-slits 562 having a length in the horizontal direction (H direction) longer than the second conductive patch 520, wherein the first sub-slits and the second sub-slits have a third interval (e.g., 0.1λ) smaller than the second interval therebetween, and (d) in FIG. 11F illustrates an arrangement state of a plurality of conductive slits 565 overlapping the first conductive patch 510 and the second conductive patch 520 at the same time.

As illustrated in Table 7 below, it can be seen that, when the antenna structure 500 including the conductive patches 510 and 520 is operated in a predetermined frequency band (e.g., an about 28 GHz band), in CDF 50% section, a gain of 2.7 dB is exhibited in (a) in FIG. 11F, a gain of 2.6 dB is exhibited in (b) in FIG. 11F, a gain of 2.6 dB is exhibited in (c) in FIG. 11F, and a gain of 2.5 dB is exhibited in (d) in FIG. 11F. For example, it can be seen that, when the plurality of sub-slits 561 and 562 formed in the conductive member 550 have horizontal lengths that match those of the conductive patches 510 and 520, respectively, and are formed to overlap the conductive patches, respectively, the gain improvement effect is improved.

TABLE 7

| | Frequency (GHz) 28 GHz | |
|---|---|---|
| Gain CDF | CDF 50% | Peak |
| No slit | 2.4 | 8.8 |
| Gap 0.44λ ((a) in FIG. 11F) | 2.7 | 8.8 |
| Gap 0.25λ ((b) in FIG. 11F) | 2.6 | 8.7 |
| Gap 0.1λ ((c) in FIG. 11F) | 2.6 | 8.7 |
| No gap ((d) in FIG. 11F) | 2.5 | 8.7 |

Figure 11G:
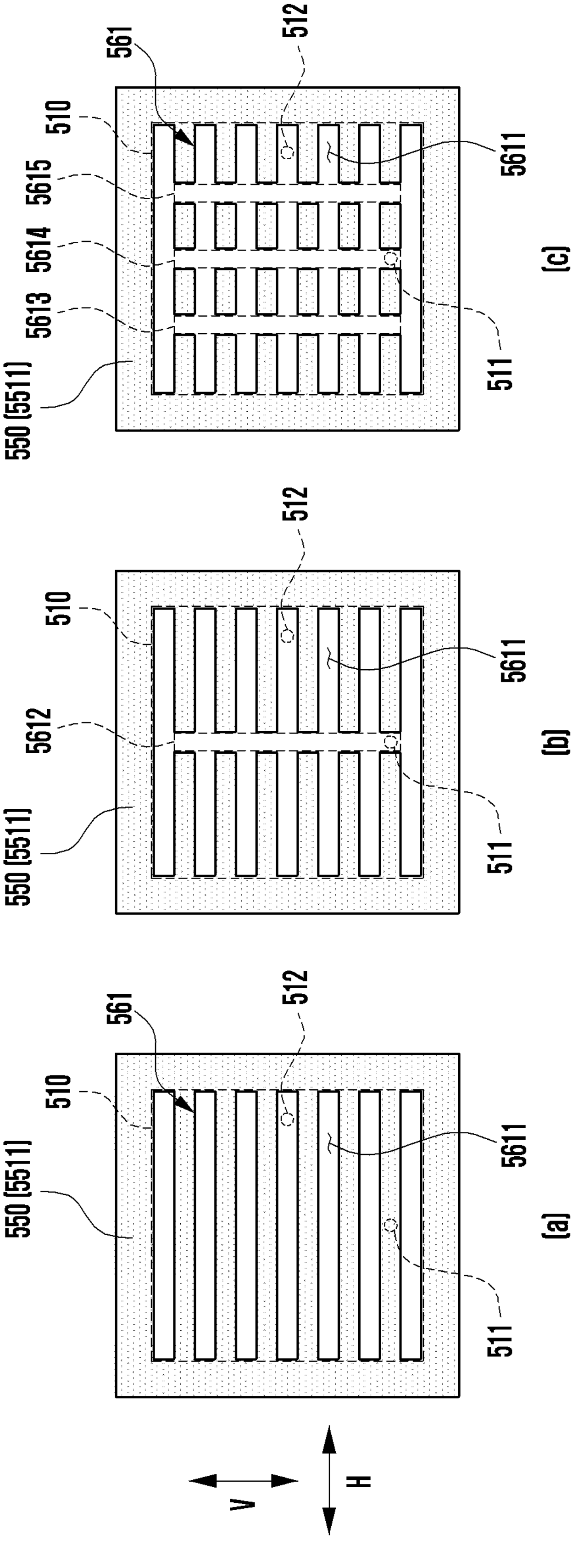

Referring to FIG. 11G, in the region overlapping the conductive patch 510, the conductive member 550 may include conductive slits 5611 all of which are arranged in the horizontal direction (H direction) and at least one vertical slit 5612, 5613, 5614, or 5615 which at least partially vertically crosses the conductive slits 5611 in the horizontal direction (H direction). According to an embodiment, (a) in FIG. 11G illustrates a state in which a plurality of conductive slits 5611 having a length in the horizontal direction (H direction) are arranged over the entire region overlapping the conductive patch 510, (b) in FIG. 11G illustrates a state in which, in addition to the conductive slits 5611 arranged to have a length in the horizontal direction (H direction), one vertical slot 5612, which vertically crosses substantially central portions of the conductive slots, is further included, and (c) in FIG. 11G illustrates a state in which, in addition to the conductive slits 5611 arranged to have a length in the horizontal direction (H direction), three vertical slots 5613, 5614, and 5615, which are arranged substantially at a predetermined interval and vertically cross the conductive slits.

As illustrated in Table 8 below, it can be seen that, when the antenna structure 500 including the conductive patch 510 is operated in a predetermined frequency band (e.g., a band of about 28 GHz), in CDF 50% section, a gain of 2.7 dB is exhibited in (a) in FIG. 11G, a gain of 2.5 dB is exhibited in (b) in FIG. 11G, and a gain of 2.6 dB is exhibited in (c) in FIG. 11G. For example, it can be seen that, when only the conductive slits 5611 formed to have a length in the horizontal direction (H direction) are arranged in the conductive member 550, the gain improvement effect is increased. In addition, it can be seen that, when the number of vertical slots 5613, 5614, and 5615 vertically crossing the conductive slits 5611 formed to have a length in the horizontal direction (H direction) increases, it may be helpful for improving the radiation performance of the antenna structure 500.

TABLE 8

| | Frequency (GHz) 28 GHz | |
|---|---|---|
| Gain CDF | CDF 50% | Peak |
| No vertical slit ((a) in FIG. 11G) | 2.7 | 8.8 |
| 1 vertical slit ((b) in FIG. 11G) | 2.5 | 8.7 |
| 3 vertical slits ((c) in FIG. 11G) | 2.6 | 8.7 |

Figure 11H:
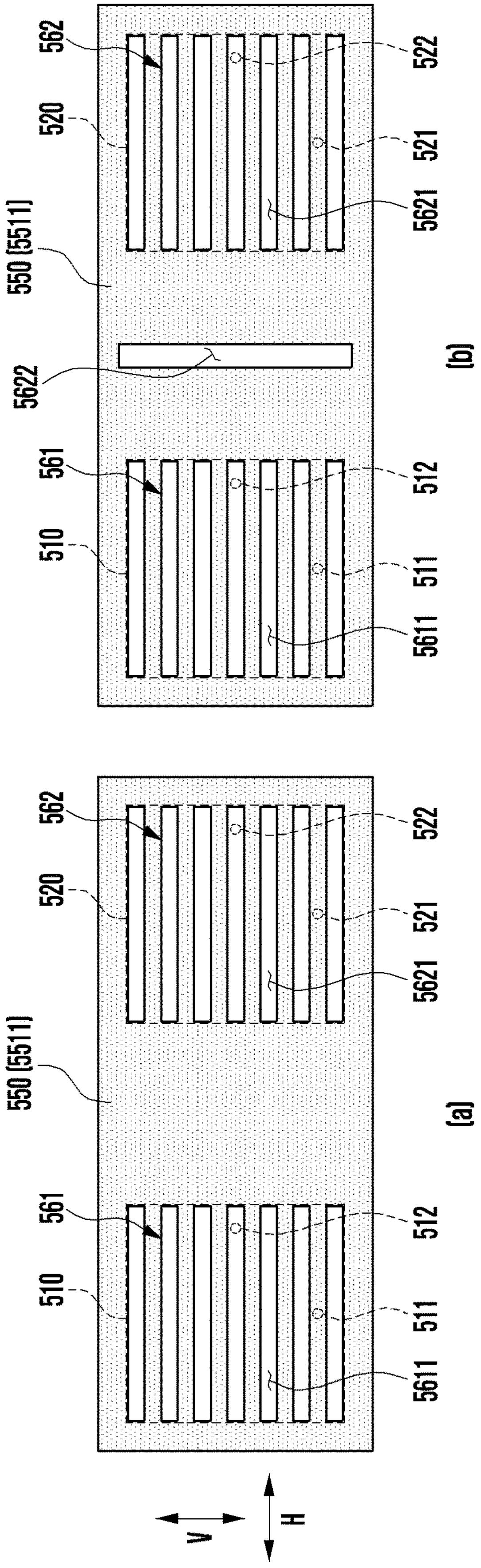

In making a description with reference to FIG. 11H, the same reference numerals are assigned to the components substantially the same as those of FIG. 11F, and a detailed description thereof may be omitted.

Referring to FIG. 11H, (a) in FIG. 11H illustrates an arrangement state of first sub-slits 561 having an overlapping region matching a first conductive patch 510 and second sub-slits 562 having an overlapping region matching a second conductive patch 520, and (b) in FIG. 11H illustrates a state in which a vertical slot 5622 formed in the vertical direction (V direction) is arranged in a substantially central portion between the first sub-slits 561 and the second sub-slits 562.

Figure 11I:
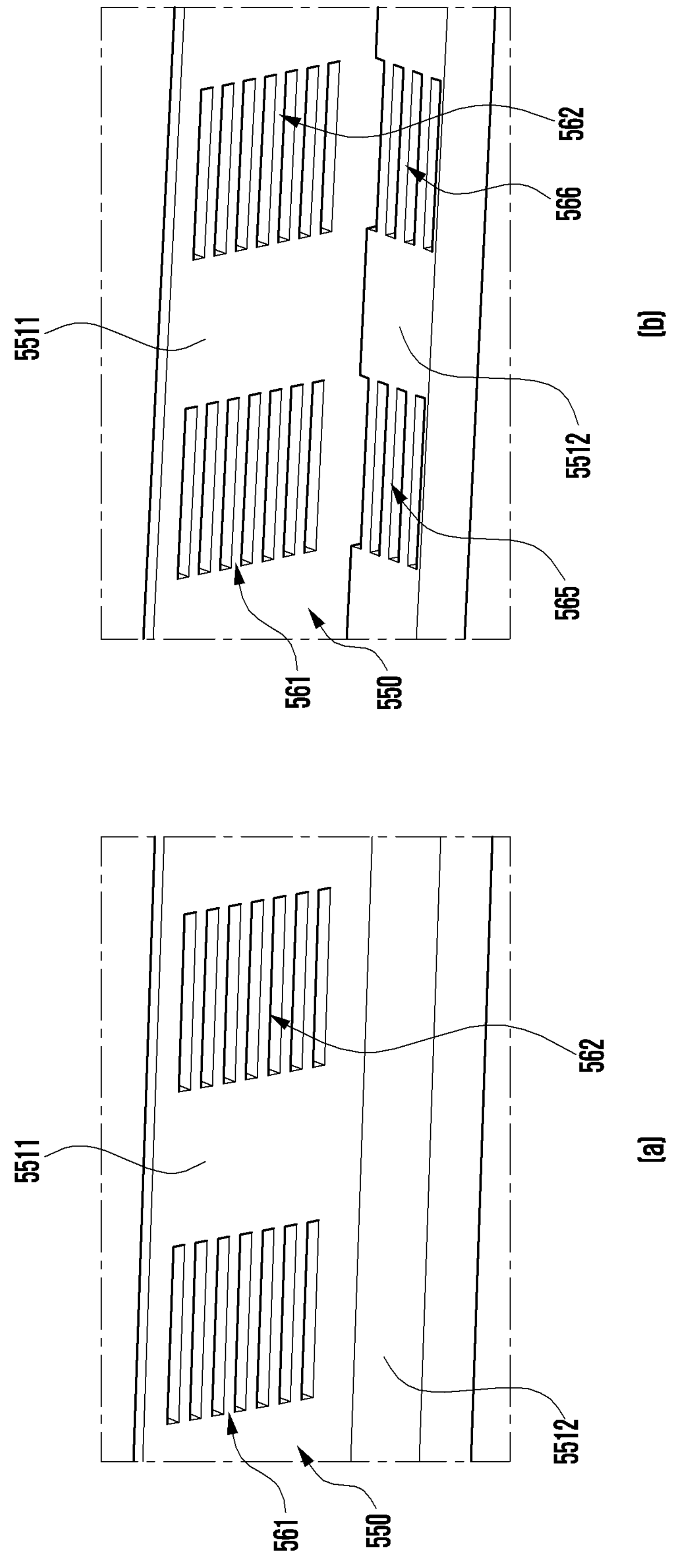

As illustrated in Table 9 below, it can be seen that, when the antenna structure 500 including the conductive patches 510 and 520 is operated in a predetermined frequency band (e.g., an about 28 GHz band), in CDF 50% section, a gain of 2.7 dB is exhibited in (a) in FIG. 11H, and a gain of 2.6 dB is exhibited in (b) in FIG. 11H. For example, it can be seen that the gain is relatively improved in both cases of (a) and (b) in FIG. 11I, compared to the case in which no conductive slit is arranged in the conductive member 550. In addition, it can be seen that, when an additional conductive slit (e.g., the vertical slit 5622) is not arranged between the first sub-slits 561 and the second sub-slits 562 formed to have a length in the horizontal direction (H direction), the radiation performance of the antenna structure 500 is relatively further improved.

TABLE 9

| | Frequency (GHz) 28 GHz | |
|---|---|---|
| Gain CDF | CDF 50% | Peak |
| No slit | 2.4 | 8.8 |
| No slit between slits ((a) in FIG. 11H) | 2.7 | 8.8 |
| Vertical slit between slits ((b) in FIG. 11H) | 2.6 | 8.7 |

Referring to FIG. 11I, (a) in FIG. 11I illustrates a state in which first sub-slits arranged at a position at which the first sub-slits at least partially overlap a first conductive patch (e.g., the first conductive patch 510 in FIG. 11H) and second sub-slits 562 arranged at a position at which the second sub-slits 562 at least partially overlap a second conductive patch (e.g., the second conductive patch 520 in FIG. 11H) are arranged in the first support portion 5511 of the conductive member 550, and (b) in FIG. 11I illustrates a state in which third sub-slits 565 (e.g., the fifth sub-slits 565 in FIG. 10) arranged at a position corresponding to the first sub-slits 561 and fourth slits 566 (e.g., the sixth sub-slits 566 in FIG. 10) arranged at a position corresponding to the second sub-slits 562 are additionally arranged in a second support portion 5512 of the conductive member.

As illustrated in Table 10 below, it can be seen that, when the antenna structure 500 including the conductive patches 510 and 520 is operated in a predetermined frequency band (e.g., a band of about 28 GHz), in CDF 50% section, a gain of 2.7 dB is exhibited in (a) in FIG. 11I, and a gain of 2.6 dB is exhibited in (b) in FIG. 11I. For example, it can be seen that the gain is relatively improved in both cases of (a) and (b) in FIG. 11I, compared to the case in which no conductive slit is arranged in the conductive member 550. In addition, it can be seen that, when the first sub-slits 561 and the second sub-slits 562 formed to have a length in the horizontal direction (e.g., H direction) are arranged in the first support portion 5511 of the conductive member 550, the radiation performance of the antenna structure 500 is relatively further improved.

TABLE 10

| | Frequency (GHz) 28 GHz | |
|---|---|---|
| Gain CDF | CDF 50% | Peak |
| No slit | 2.4 | 8.8 |
| First support portion slits ((a) in FIG. 11I) | 2.7 | 8.8 |
| First support slits + second support slits ((b) in FIG. 11I) | 2.6 | 8.7 |

Figure 11J:
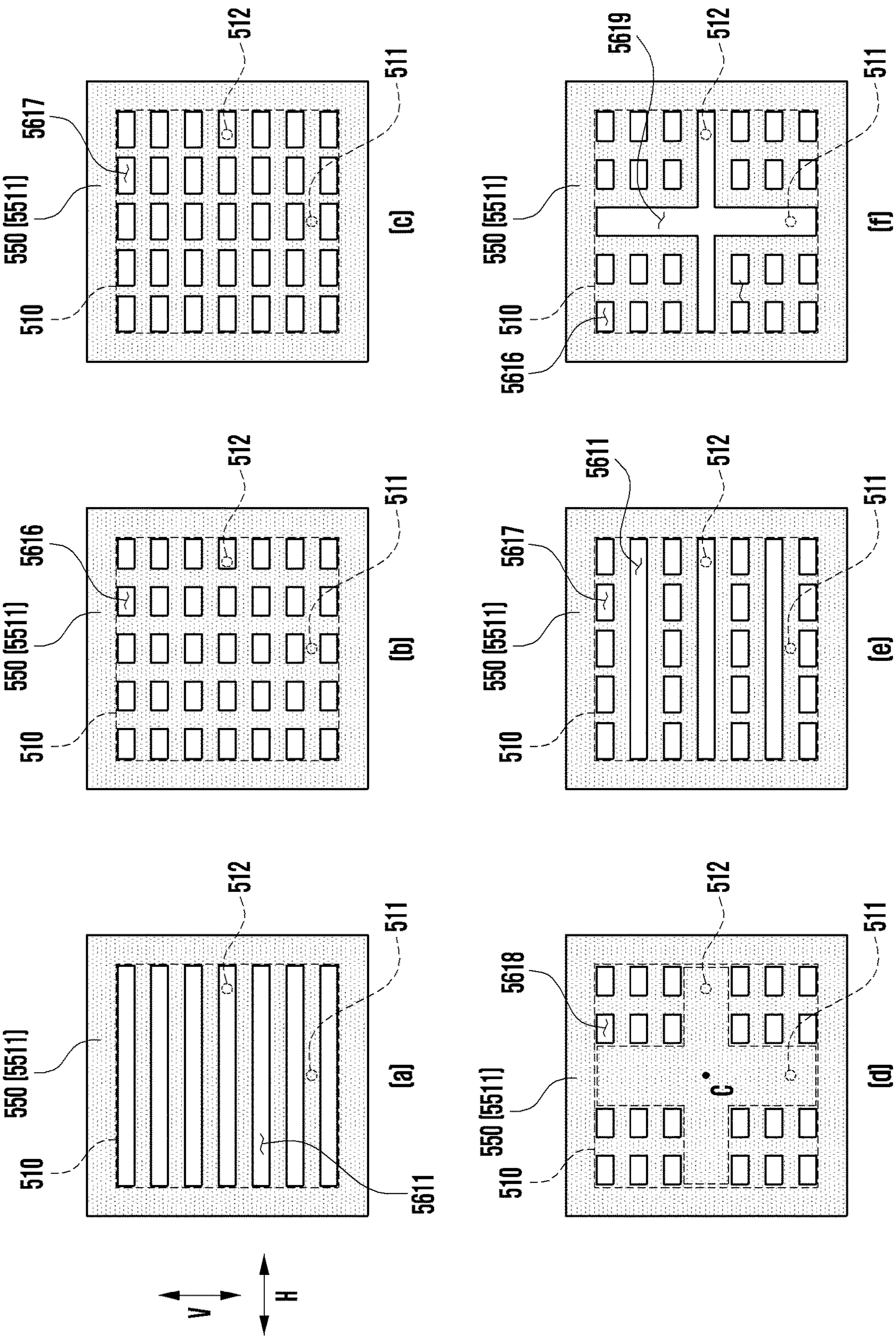

Referring to FIG. 11J, (a) in FIG. 11J is a view illustrating a state in which conductive slits 5611 having a length in the horizontal direction (H direction) are arranged over the entire region overlapping the conductive patch 510 at a predetermined interval, (b) and (c) in FIG. 11J are views illustrating a state in which a plurality of micro slits 5616 and 5617 are arranged at predetermined intervals in the horizontal direction (H direction) and the vertical direction (V direction) over the entire region overlapping the conductive patch 510, (d) in FIG. 11J is a view illustrating a state in which a plurality of micro slits 5618 are arranged in a region except for a cross-shaped space including a region overlapping the center C of the conductive patch 510, (e) in FIG. 11J is a view illustrating a state in which conductive slits 5611 having a length in the horizontal direction (H direction) are alternately arranged with a plurality of micro slits 5617 such that each conductive slits is arranged between adjacent rows of micro slits 5617, and (f) in FIG. 11J is a view illustrating a state in which a cross-shaped slit 5619 including a region overlapping the center C of the conductive patch 510 and a plurality of micro slits 5616 arranged around the cross-shaped slit 5616 are arranged.

As illustrated in Table 11 below, it can be seen that, when the antenna structure 500 including the conductive patch 510 is operated in a predetermined frequency band (e.g., a band of about 28 GHz), in CDF 50% section, a gain of 2.7 dB is exhibited in (a) in FIG. 11J, a gain of 2.4 dB is exhibited in (b) to (d) in FIG. 11J, and a gain of 2.6 dB is exhibited in (e) and (f) in FIG. 11J. For example, it can be seen that the gain is relatively improved in all cases of (a) to (f) in FIG. 11J, compared to the case in which no conductive slit is arranged in the conductive member 550. In addition, it can be seen that, when the conductive slits 5611 having a length in the horizontal direction (H direction) are arranged over the entire area overlapping the conductive patch 510, the radiation performance of the antenna structure 500 is relatively further improved.

TABLE 11

| | Frequency (GHz) 28 GHz | |
|---|---|---|
| Gain CDF | CDF 50% | Peak |
| No slit | 2.4 | 8.8 |
| Horizontal slits ((a) in FIG. 11J) | 2.7 | 8.8 |
| Micro slits 1 ((b) in FIG. 11J) | 2.4 | 8.8 |
| Micro slits 2 ((c) in FIG. 11J) | 2.4 | 8.8 |
| Micro slits 3 ((d) in FIG. 11J) | 2.4 | 8.8 |
| Micro slits 4 ((e) in FIG. 11J) | 2.6 | 8.8 |
| Micro slits 5 ((f) in FIG. 11J) | 2.6 | 8.6 |

Figure 12A:
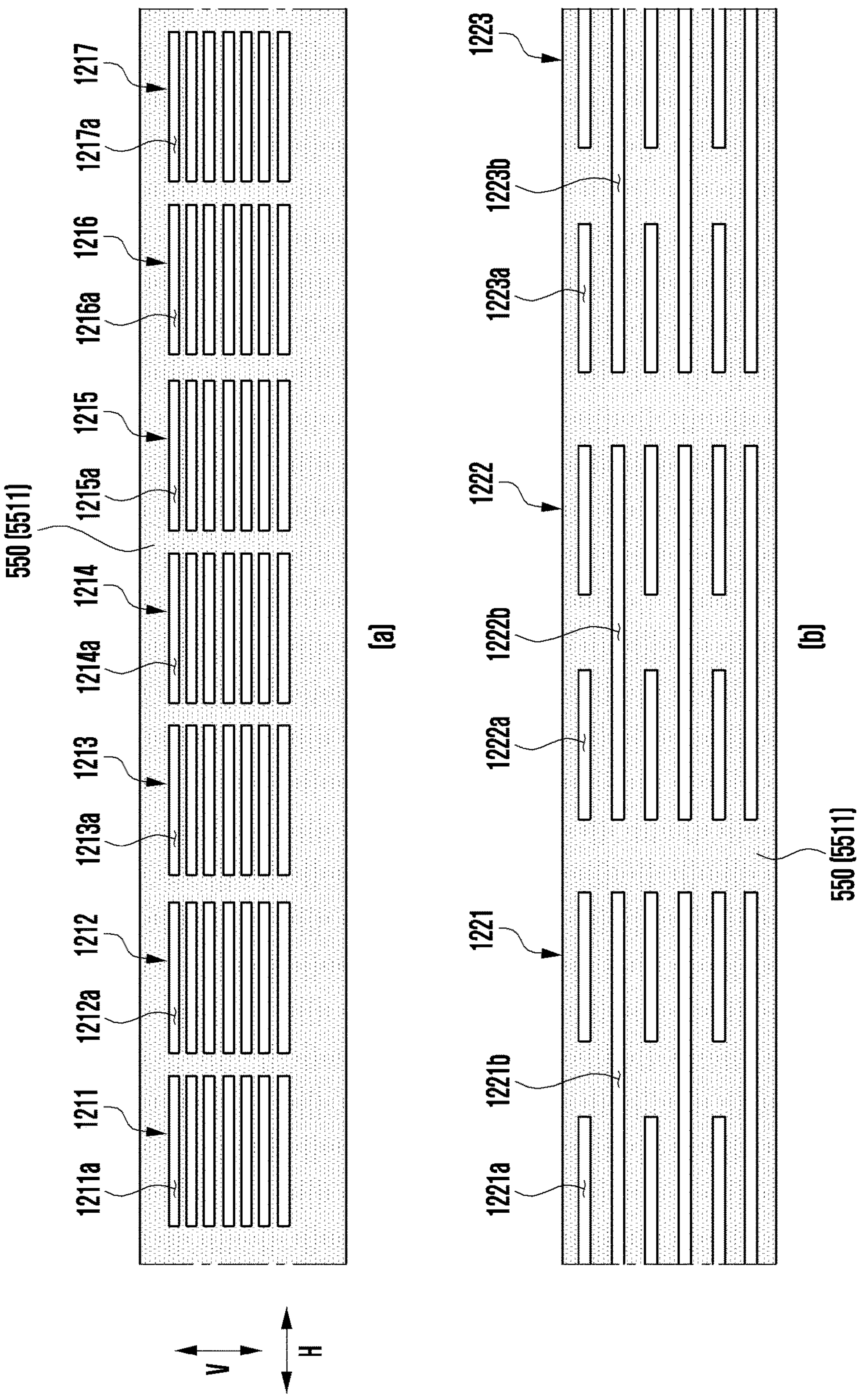
FIGS. 12A to 12C are views illustrating partial configurations of conductive members, respectively, in which various shapes and arrangement structures of a plurality of slits according to certain embodiments of the disclosure are illustrated.
Figure 12B:
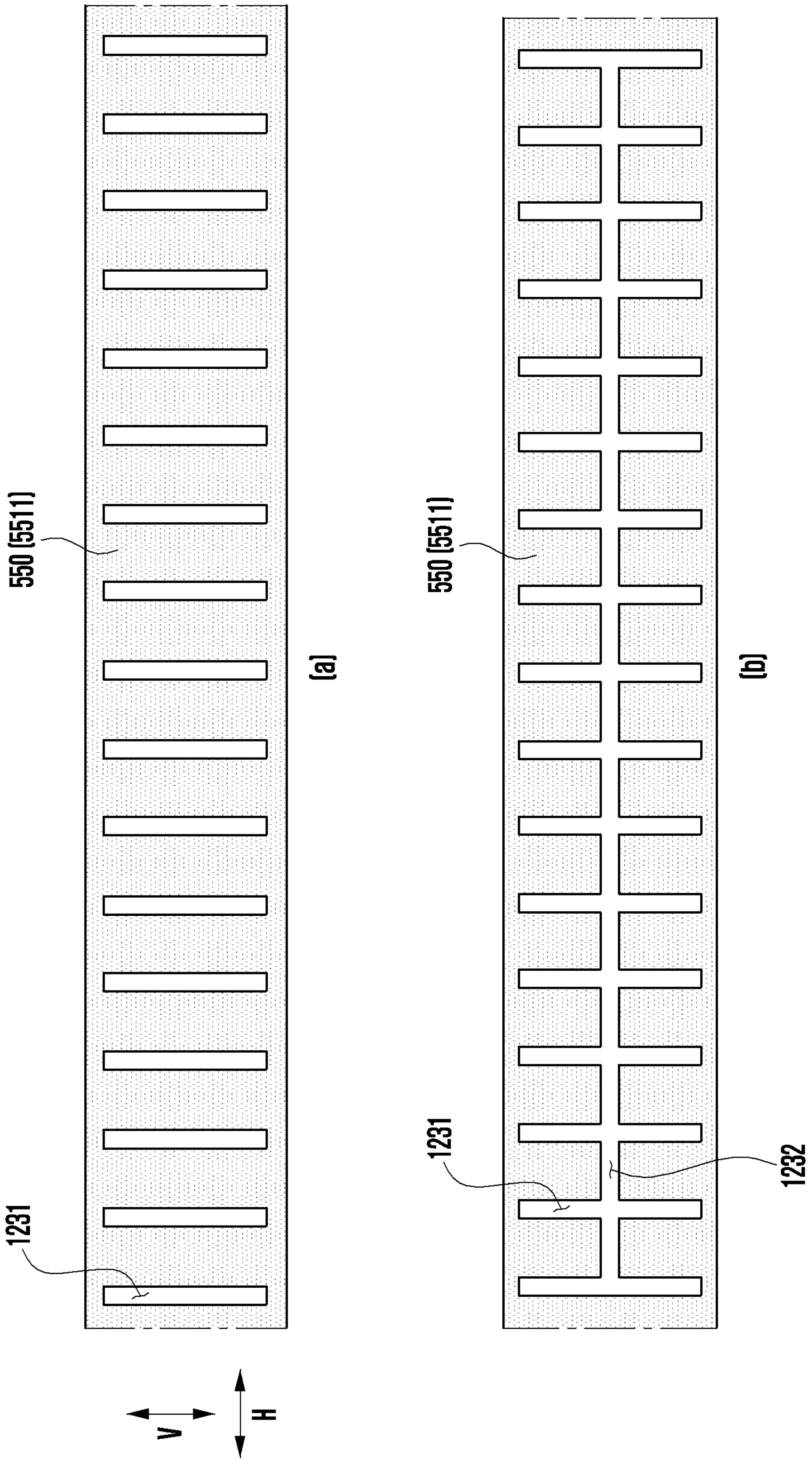
Figure 12C:
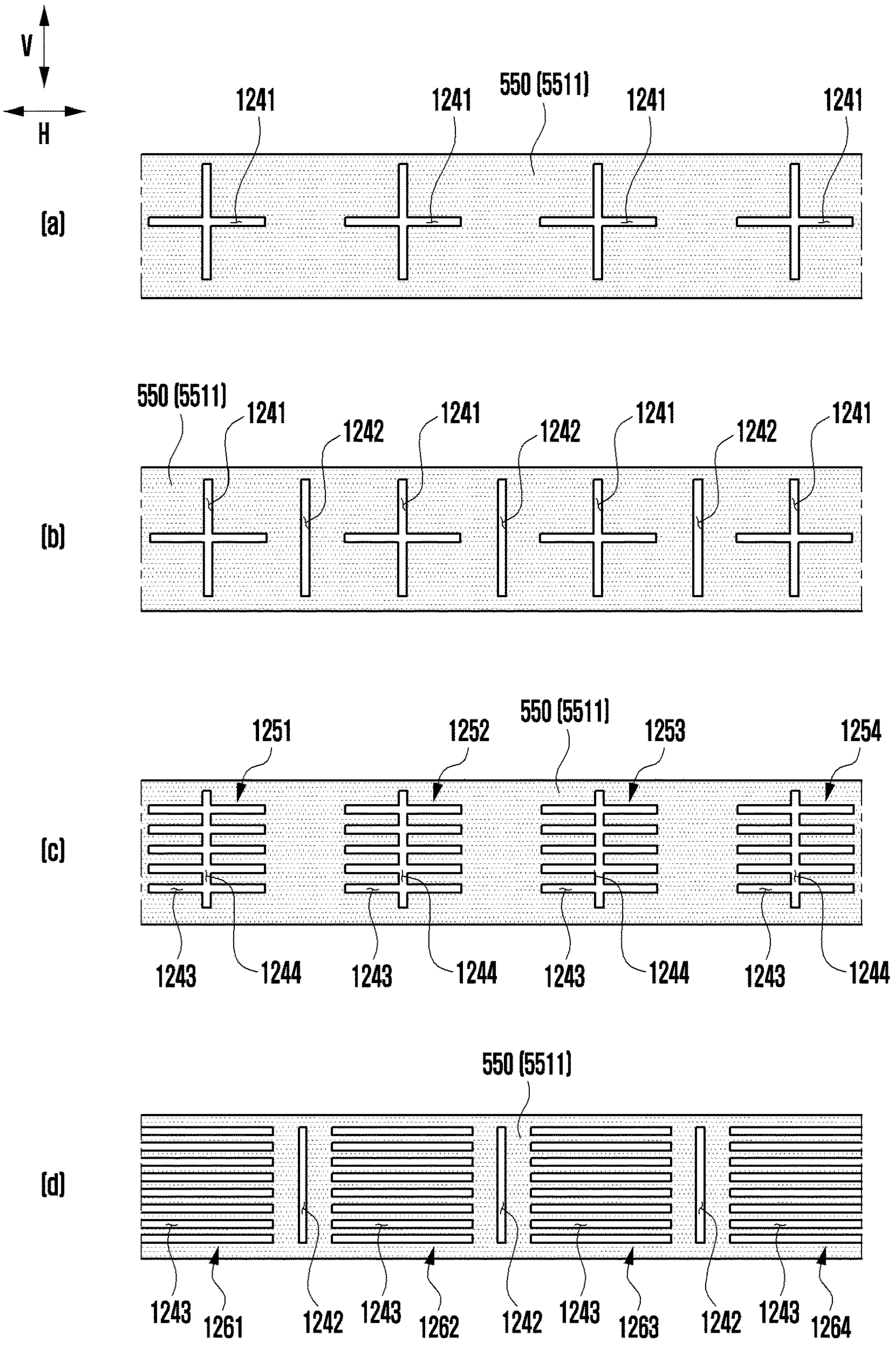

FIGS. 12A to 12C are views illustrating partial configurations of conductive members, respectively, in which various shapes and arrangement structures of a plurality of slits according to certain embodiments of the disclosure are illustrated.

Referring to FIG. 12A, the conductive member 550 may include a plurality of conductive slits formed in a horizontal direction (H direction) and having various arrangement structures. For example, as illustrated in (a) in FIG. 12A, the conductive member 550 may include a plurality of conductive slits formed in the horizontal direction (H direction) in the first support portion 5511. The plurality of conductive slits may include first sub-slits 1211 formed of a group of first unit slits 1211*a*, second sub-slits 1212 arranged to be spaced apart from the first sub-slits 1211 by a predetermined interval and formed of a group of second unit slits 1212*a*, third sub-slits 1213 arranged to be spaced apart from the second sub-slits 1212 by a predetermined interval and formed of a group of third unit slits 1213*a*, fourth sub-slits 1214 arranged to be spaced apart from the third sub-slits 1213 by a predetermined interval and formed of a group of fourth unit slits 1214*a*, fifth sub-slits 1215 arranged to be spaced apart from the fourth sub-slits 1214 by a predetermined interval and formed of a group of fifth unit slits 1215*a*, sixth sub-slits 1216 arranged to be spaced apart from the fifth sub-slits 1215 by a predetermined interval and formed of a group of sixth unit slits 1216*a*, and seventh sub-slits 1217 arranged to be spaced apart from the sixth sub-slits 1216 by a predetermined interval and formed of a group of seventh unit slits 1217*a*. According to an embodiment, each of the sub-slits 1211, 1212, 1213, 1214, 1215, 1216, and 1217 may be arranged at a position at which each of the sub-slits 1211, 1212, 1213, 1214, 1215, 1216, and 1217 at least partially overlaps the respective conductive patches (e.g., the conductive patches 510, 520, 530, and 540 in FIG. 7C) of the antenna structure (e.g., the antenna structure 500 in FIG. 7C). In some embodiments, each of the sub-slits 1211, 1212, 1213, 1214, 1215, 1216, and 1217 may be arranged such that two or more of the sub-slits at least partially overlap one or more conductive patches. In some embodiments, at least one of the sub-slits 1211, 1212, 1213, 1214, 1215, 1216, and 1217 may be arranged to at least partially overlap two or more conductive patches. In some embodiments, the unit slits of at least one of the unit slits

1211*a*, 1212*a*, 1213*a*, 1214*a*, 1215*a*, 1216*a*, and 1217*a* forming respective sub-slits 1211, 1212, 1213, 1214, 1215, 1216, and 1217 may have substantially the same shape or different shapes.

As illustrated in (b) in FIG. 12A, the conductive member 550 may include a plurality of conductive slits formed in the horizontal direction (H direction) in the first support portion 5511. The plurality of conductive slits may include first sub-slits 1221 including first unit slits 1221*a*, which are spaced apart from each other by a predetermined interval in the horizontal direction (H direction) and arranged in the vertical direction (V direction), and second unit slits 1221*b*, which are alternately arranged with the first unit slits 1221*a* such that each second unit slit is arranged between vertically adjacent first unit slit pairs, second sub-slits 1222 including third unit slits 1222*a*, which are spaced apart from each other by a predetermined interval in the horizontal direction (H direction) and arranged in the vertical direction (V direction), and fourth unit slits 1222*b*, which are alternately arranged with the third unit slits 1222*a* such that each fourth unit slit is arranged between vertically adjacent third unit slit pairs, and third sub-slits 1223 including fifth unit slits 1223*a*, which are spaced apart from each other by a predetermined interval in the horizontal direction (H direction) and arranged in the vertical direction (V direction), and sixth unit slits 1223*b*, which are alternately arranged with the fifth unit slits 1223*a* such that each fourth unit slit is arranged between vertically adjacent third unit slit pairs. According to an embodiment, each of the sub-slits 1221, 1222, and 1223 may be arranged at a position at which each of the sub-slits 1221, 1222, and 1223 at least partially overlaps each of the conductive patches (e.g., the conductive patches 510, 520, 530, and 540 in FIG. 7C) of the antenna structure (e.g., the antenna structure 500 in FIG. 7C). In some embodiments, each of the sub-slits 1221, 1222, and 1223 may be arranged such that two or more of the sub-slits at least partially overlap one conductive patch. In some embodiments, at least one of the sub-slits 1221, 1222, and 1223 may be arranged to at least partially overlap two or more conductive patches.

Referring to FIG. 12B, the conductive member 550 may include a plurality of conductive slits 1231 formed in a vertical direction (V direction) and having various arrangement structures. For example, as illustrated in (a) in FIG. 12B, the conductive member 550 may include a plurality of conductive slits 1231 arranged in the first support portion 5511, having a length in the vertical direction (V direction), and arranged at a predetermined interval in the horizontal direction (H direction). According to an embodiment, as illustrated in (b) in FIG. 12B, the conductive member 550 may include at least one horizontal slit 1232 arranged to cross the plurality of conductive slits 1231 of (a) in FIG. 12B in the horizontal direction (H direction).

Referring to FIG. 12C, the conductive member 550 may include a plurality of conductive slits formed to have a length in the vertical direction (V direction) and/or the horizontal direction (H direction). According to an embodiment, as illustrated in (a) in FIG. 12C, the conductive member 550 may include a plurality of cross-shaped conductive slits 1241 arranged in the first support portion 5511 at a predetermined interval in the horizontal direction (H direction). According to an embodiment, as illustrated in (b) in FIG. 12C, the conductive member 550 may include vertical slits 1242, each of which is further arranged between adjacent cross-shaped conductive slits 1241 among the plurality of cross-shaped conductive slits 1241 in (a) in FIG. 12C. According to an embodiment, as illustrated in (c) in FIG. 12C, the conductive member 550 may include sub-slits 1251, 1252, 1253, and 1254 arranged in the first support portion 5511, having a length in the horizontal direction (H direction), and including a plurality of first unit slits 1243 arranged at a predetermined interval in the vertical direction (V direction), and a vertical slit 1244 closing the centers of plurality of first unit slits 1243 in common. According to an embodiment, as illustrated in (d) in FIG. 12C, the conductive member 550 may include a plurality of sub-slits 1261, 1262, 1263, and 1264 arranged in the first support portion 5511, having a length in the horizontal direction (H direction), and including a plurality of first unit slits 1243 and arranged at a predetermined interval in the vertical direction (V direction), and at least one vertical slit 1242 arranged in the vertical direction (V direction) in the space between the plurality of first unit slits 1243.

According to certain embodiments, an electronic device (e.g., the electronic device 700 in FIG. 7C) may include a housing (e.g., the housing 710 in FIG. 7C) including a non-conductive portion (e.g., the non-conductive portion 722 in FIG. 7C), an antenna structure (e.g., the antenna structure 500 in FIG. 7C) arranged in the housing, wherein the antenna structure includes a substrate (e.g., the substrate 590 in FIG. 7C) includes a first substrate surface(e.g., the first substrate surface 5901 in FIG. 7C) facing a first direction (e.g., the first direction (direction ①) in FIG. 7B) and a second substrate surface(e.g., the second substrate surface 5902 in FIG. 7C) facing opposite the first substrate surface, and at least one antenna element (e.g., the conductive patches 510, 520, 530, and 540 in FIG. 7C) arranged on the substrate to form a beam pattern in the first direction, a conductive member (e.g., the conductive member 550 in FIG. 7C) including a plurality of first slits (e.g., the plurality of slits 560 in FIG. 7C) arranged in an inner space of the housing to at least partially face the second substrate surface and formed at a position where the plurality of first slits at least partially overlap at least one antenna element when the first substrate surface is viewed from above, and a wireless communication circuit (e.g., the wireless communication circuit 595 in FIG. 5B) configured to transmit or receive a wireless signal in a predetermined frequency band through the at least one antenna element. The at least one antenna element may be arranged at a position at which the antenna structure at least partially overlaps the non-conductive portion when the housing is viewed from the outside.

According to certain embodiments, the at least one antenna element may include at least one feeding portion, and the plurality of first slits may be formed to have a length in a direction perpendicular to a polarization direction through the at least one feeding portion.

According to certain embodiments, the at least one feeding portion may include a first feeding portion disposed on a first virtual line passing through a center of the at least one antenna element and a second feeding portion disposed on a second virtual line passing through the center and orthogonal to the first virtual line.

According to certain embodiments, the plurality of first slits may be perpendicular to the polarization direction of the first feeding portion, and the wireless communication circuit may be configured to form a vertically polarized wave through the first feeding portion.

According to certain embodiments, the at least one antenna element may include a plurality of antenna elements arranged at an interval, and the plurality of first slits may be arranged at a position at which the first slits at least partially overlap the plurality of antenna elements, respectively, when the substrate surface is viewed from above.

According to certain embodiments, the conductive member may include a conductive sheet arranged on the second substrata surface.

According to certain embodiments, the conductive member may include a conductive plate arranged in the housing to support the substrate.

According to certain embodiments, the conductive plate may include a first support portion arranged to face the second substrate surface, and the plurality of first slits may be formed in the first support portion.

According to certain embodiments, the substrate includes a substrate side-surface surrounding a space between the first substrate surface and the second substrate surface, wherein the substrate side-surface may include a first substrate side-surface having a first length and corresponding to the housing, a second substrate side-surface extending vertically from the first substrate side-surface and having a second length shorter than the first length, a third substrate side-surface extending from the second substrate side-surface parallel to the first substrate side-surface and having the first length, and a fourth substrate side-surface extending from the third substrate side-surface parallel to the second substrate side-surface and having the second length. The conductive plate may include a second support portion extending from the first support portion and arranged to face the first substrate side-surface, the second support portion may include a plurality of second slits, and the plurality of second slits may be arranged at a position at which the second slits at least partially overlap the at least one antenna element when the first substrate side-surface is viewed from the outside.

According to certain embodiments, the conductive plate may include a third support portion extending from the first support portion, facing the second substrate side-surface, and including a plurality of third slits, a fourth support portion extending from the first support portion, facing the third substrate side-surface, and including a plurality of fourth slits, and a fifth support portion extending from the first support portion, facing the fourth substrate side-surface, and including a plurality of fifth slits.

According to certain embodiments, the wireless communication circuit may be arranged on the second substrate surface.

According to certain embodiments, the electronic device may further include a protection member arranged on the second substrate surface of the substrate to at least partially surround the wireless communication circuit.

According to certain embodiments, the electronic device may further include a shield layer arranged on the protection member.

According to certain embodiments, the housing may include a side surface arranged to be at least partially visible from the outside through a side member, and the substrate may be arranged in the inner space of the housing such that a beam pattern is formed in the first direction in which the side surface of the housing is oriented.

According to certain embodiments, the housing may include a front plate, a rear plate facing away from the front plate, and a side member surrounding the inner space between the front plate and the rear plate. The electronic device may further include a display arranged in the inner space and arranged to be at least partially visible from the outside through the front plate.

According to certain embodiments, the substrate may be arranged in the inner space such that the beam pattern is formed in a direction in which the side member is oriented.

According to certain embodiments, the substrate may be arranged in the inner space such that the beam pattern is formed in a direction in which the rear plate is oriented.

According to certain embodiments, the wireless communication circuit may be configured to transmit and/or receive a wireless signal in a frequency band ranging from 3 GHz to 100 GHz via the at least one antenna element.

According to certain embodiments, an electronic device may include a housing including a conductive portion forming at least a portion of a side surface and a remaining portion, a wireless communication circuit arranged in an inner space of the housing, and an antenna structure arranged in the inner space, wherein the antenna structure includes a substrate and at least one antenna element arranged on a substrate surface, a conductive member including a plurality of slits arranged in an inner space of the housing to at least partially face the opposite substrate surface and formed at a position at which the slits at least partially overlap the at least one antenna element when the substrate surface is viewed from above, and a wireless communication circuit configured to transmit or receive a wireless signal in a predetermined frequency band through the at least one antenna element. The antenna structure may be arranged at a position which the remaining portion fully overlaps the antenna structure when the side surface is viewed from outside. The at least one antenna element may form a beam in a direction towards the remaining portion According to certain embodiments, the at least one antenna element may include at least one feeding portion, and the plurality of first slits may be formed to have a length in a direction perpendicular to a polarization direction through the at least one feeding portion.

The embodiments of the disclosure disclosed in this specification and drawings are provided merely to propose specific examples in order to easily describe the technical features according to the embodiments of the disclosure and to help understanding of the embodiments of the disclosure, and are not intended to limit the scope of the embodiments of the disclosure. Accordingly, the scope of the certain embodiments of the disclosure should be construed in such a manner that, in addition to the embodiments disclosed herein, all changes or modifications derived from the technical idea of the certain embodiments of the disclosure are included in the scope of the certain embodiments of the disclosure.

The invention claimed is:

1. An electronic device comprising:

a housing including a side member forming at least a part of a side surface of the electronic device, the side member including a conductive portion and a non-conductive portion;

an antenna structure arranged in the housing, wherein the antenna structure includes:

a substrate including a first substrate surface facing a first direction and a second substrate surface facing opposite the first substrate surface, the substrate being disposed in the housing such that the first substrate surface thereof faces the side surface; and at least one antenna element arranged on the substrate to form a beam pattern in the first direction in which the first substrate surface is oriented;

a conductive plate disposed on the conductive portion to support the substrate in an inner space of the housing, the conductive plate including a first support portion arranged to be in contact with the second substrate surface of the substrate and a plurality of first slits formed in the first support portion, the plurality of first slits being formed at a position where the plurality of first slits at least partially overlap the at least one antenna element when the first substrate surface is viewed from above; and a wireless communication circuit configured to transmit or receive a wireless signal in a predetermined frequency band through the at least one antenna element, wherein the at least one antenna element is arranged to at least partially overlap the non-conductive portion of the side member when the housing is viewed from outside.

2. The electronic device of claim 1, wherein the at least one antenna element includes at least one feeding portion, and the plurality of first slits is formed to have a length in a direction perpendicular to a polarization direction through the at least one feeding portion.

3. The electronic device of claim 2, wherein the at least one feeding portion includes a first feeding portion disposed on a first virtual line passing through a center of the at least one antenna element and a second feeding portion disposed on a second virtual line passing through the center and orthogonal to the first virtual line.

4. The electronic device of claim 3, wherein the plurality of first slits is perpendicular to the polarization direction of the first feeding portion, and the wireless communication circuit is configured to form a vertically polarized wave through the first feeding portion.

5. The electronic device of claim 1, wherein the at least one antenna element includes a plurality of antenna elements arranged at an interval, and the plurality of first slits is arranged at a position at which the first slits at least partially overlap the plurality of antenna elements, respectively, when the first substrate surface is viewed from above.

6. The electronic device of claim 1, wherein the substrate includes a substrate side-surface surrounding a space between the first substrate surface and the second substrate surface, wherein the substrate side-surface includes:

a first substrate side-surface having a first length and corresponding to the housing;

a second substrate side-surface extending vertically from the first substrate side-surface and having a second length shorter than the first length;

a third substrate side-surface extending from the second substrate side-surface parallel to the first substrate side-surface and having the first length; and a fourth substrate side-surface extending from the third substrate side-surface parallel to the second substrate side-surface and having the second length, wherein the conductive plate includes a second support portion extending from the first support portion and arranged to face the first substrate side-surface, wherein the second support portion includes a plurality of second slits, and wherein the plurality of second slits is arranged at a position at which the second slits at least partially overlap the at least one antenna element when the first substrate side-surface is viewed from the outside.

7. The electronic device of claim 6, wherein the conductive plate includes:

a third support portion extending from the first support portion, facing the second substrate side-surface, and including a plurality of third slits;

a fourth support portion extending from the first support portion, facing the third substrate side-surface, and including a plurality of fourth slits; and a fifth support portion extending from the first support portion, facing the fourth substrate side-surface, and including a plurality of fifth slits.

8. The electronic device of claim 1, wherein the wireless communication circuit is arranged on the second substrate surface.

9. The electronic device of claim 8, further comprising:

a protection member arranged on the second substrate surface of the substrate to at least partially surround the wireless communication circuit.

10. The electronic device of claim 9 further comprising:

a shield layer arranged on the protection member.

11. The electronic device of claim 1, wherein the side surface is arranged to be at least partially visible from the outside of the electronic device, and the substrate is arranged in the inner space of the housing such that a beam pattern is formed in the first direction in which the side surface of the housing is oriented.

12. The electronic device of claim 1, wherein the housing includes:

a front plate;

a rear plate facing away from the front plate; and the side member surrounding the inner space between the front plate and the rear plate, wherein the electronic device further comprises:

a display arranged in the inner space and arranged to be at least partially visible from the outside of the electronic device through the front plate.

13. The electronic device of claim 12, wherein the substrate is arranged in the inner space such that the beam pattern is formed in the first direction in which the side member is oriented.

14. The electronic device of claim 12, wherein the substrate is arranged in the inner space such that the beam pattern is formed in a direction in which the rear plate is oriented.

15. The electronic device of claim 1, wherein the wireless communication circuit is configured to transmit and/or receive a wireless signal in a frequency band ranging from 3 GHz to 100 GHz via the at least one antenna element.

* * * * *